(12) United States Patent
Tanabe et al.

(10) Patent No.: US 7,423,784 B2
(45) Date of Patent: Sep. 9, 2008

(54) PROCESSING OF SIGNALS FROM IMAGE SENSING APPARATUS WHOSE IMAGE SENSING AREA INCLUDES A PLURALITY OF AREAS

(75) Inventors: Masatoshi Tanabe, Ibaraki (JP); Kenji Hiromatsu, Chiba (JP); Mitsuhiro Sugeta, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 972 days.

(21) Appl. No.: 10/226,819

(22) Filed: Aug. 22, 2002

(65) Prior Publication Data

US 2003/0038983 A1    Feb. 27, 2003

(30) Foreign Application Priority Data

Aug. 22, 2001  (JP)  ............................. 2001-251351
Jan. 18, 2002  (JP)  ............................. 2002-009741

(51) Int. Cl.
*H04N 1/40* (2006.01)
(52) U.S. Cl. ...................... 358/461; 358/504; 358/518; 382/167; 399/38; 399/130
(58) Field of Classification Search ................. 358/461, 358/504, 518; 382/167; 399/38, 130
See application file for complete search history.

(56) References Cited

U.S. PATENT DOCUMENTS

| | | | | |
|---|---|---|---|---|
| 4,660,082 A | * | 4/1987 | Tomohisa et al. | 348/615 |
| 4,920,428 A | * | 4/1990 | Lin et al. | 358/461 |
| 5,347,370 A | * | 9/1994 | Ishihara et al. | 358/461 |
| 5,361,140 A | * | 11/1994 | Hayenga et al. | 358/446 |
| 5,818,521 A | | 10/1998 | Hieda | |
| 5,838,463 A | * | 11/1998 | Gahang | 358/465 |
| 5,920,344 A | * | 7/1999 | Kim | 348/246 |
| 6,055,066 A | * | 4/2000 | Kanda | 358/461 |
| 6,249,358 B1 | * | 6/2001 | Bryant et al. | 358/461 |
| 6,573,934 B1 | | 6/2003 | Lee | |
| 6,657,748 B1 | * | 12/2003 | Okita et al. | 358/461 |
| 6,753,910 B1 | * | 6/2004 | Ogata et al. | 348/235 |
| 6,961,151 B1 | * | 11/2005 | Nara | 358/3.26 |
| 2001/0030770 A1 | * | 10/2001 | Ohashi | 358/465 |
| 2002/0003908 A1 | * | 1/2002 | Kijima et al. | 382/274 |
| 2002/0012127 A1 | * | 1/2002 | Soeda et al. | 358/1.9 |
| 2002/0154229 A1 | | 10/2002 | Takahashi et al. | |

FOREIGN PATENT DOCUMENTS

EP    0878 958    4/1998

(Continued)

OTHER PUBLICATIONS

KR Abstract 265 762, Sep. 15, 2000.

(Continued)

*Primary Examiner*—Twyler L. Haskins
*Assistant Examiner*—Jacky X Zheng
(74) *Attorney, Agent, or Firm*—Morgan & Finnegan, LLP

(57) ABSTRACT

An image processing apparatus includes an image sensor formed from a plurality of areas each including a plurality of pixels, and a corrector adapted to correct signals from the plurality of areas of the image sensor. The corrector has a plurality of correction data smaller in number than the areas, and performs correction by selectively using the correction data for each area of the image sensor.

7 Claims, 28 Drawing Sheets

FOREIGN PATENT DOCUMENTS

| | | |
|---|---|---|
| JP | 62-200875 | 9/1987 |
| JP | 2-254864 | 10/1990 |
| JP | 03-040665 | 2/1991 |
| JP | 03-055960 | 3/1991 |
| JP | 03-145271 | 6/1991 |
| JP | 04-030670 | 2/1992 |
| JP | 05-063977 | 3/1993 |
| JP | 05-313775 | 11/1993 |
| JP | 7-264406 A | 10/1995 |
| JP | 10-257312 | 9/1996 |
| JP | 2000-183753 | 6/2000 |
| JP | 2000166394 * | 6/2000 |
| JP | 2000-244739 | 9/2000 |
| WO | 01/58142 | 8/2001 |

OTHER PUBLICATIONS

European Patent Office; "European Search Report"; of corresponding European Patent No. EP 02 01 8714; date mailed Dec. 2, 2004; (3 pages).

Korean Industrial Property Office; "Korean Patent Abstracts"; of Korean Patent Publication No. KR 265 762 B1; Jun. 17, 2000; (1 page).

* cited by examiner

F I G. 5
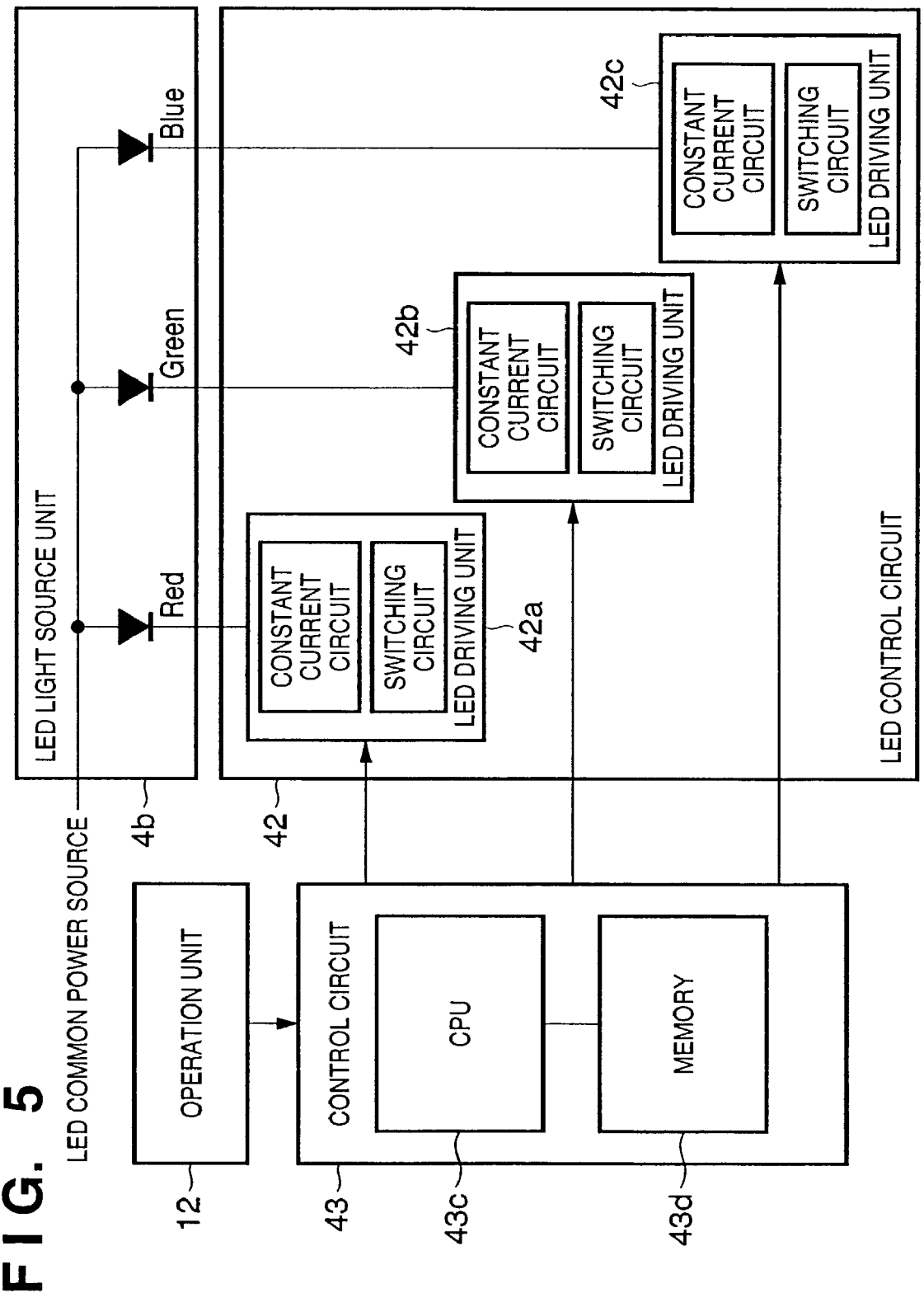

F I G. 7
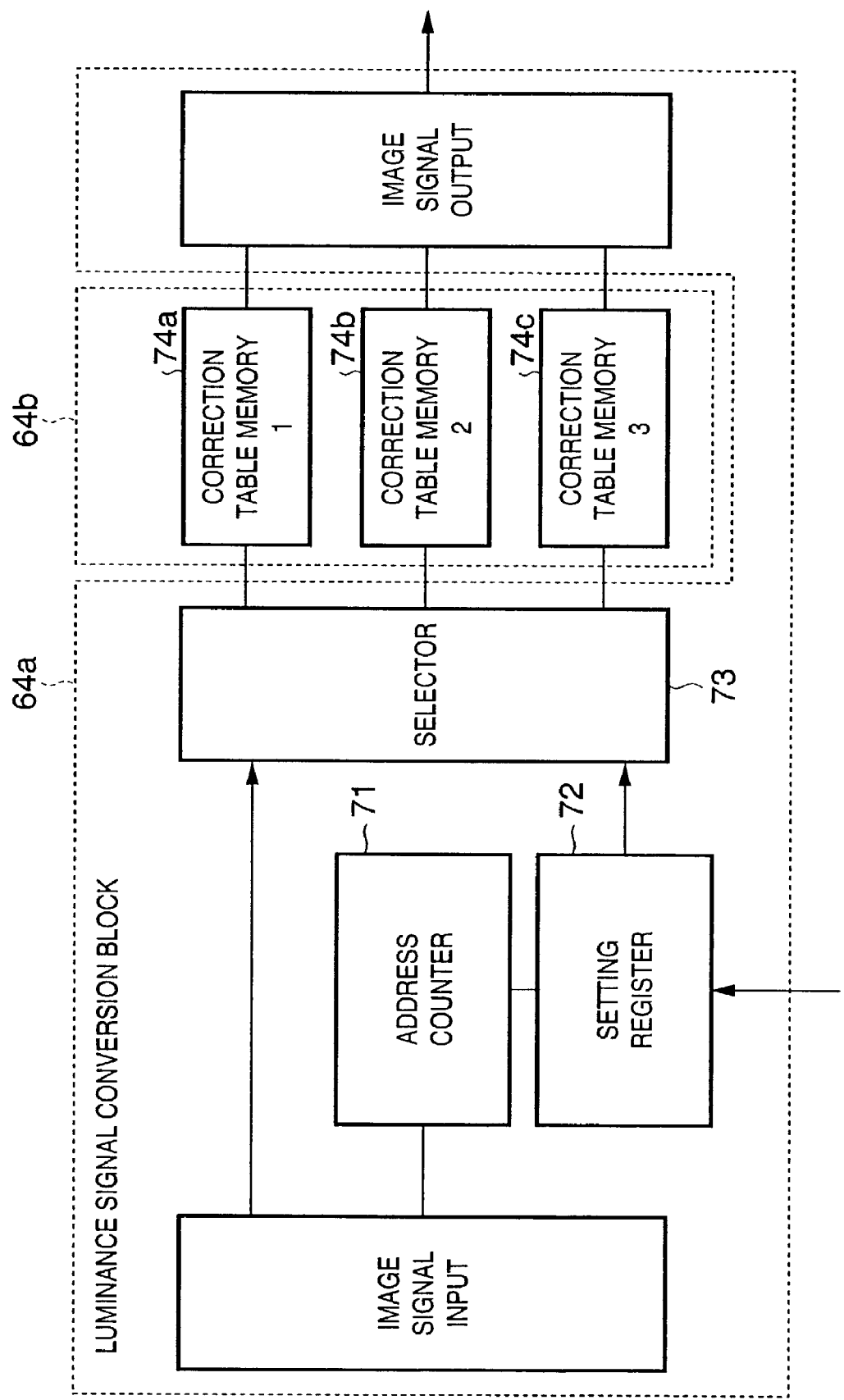

F I G. 12
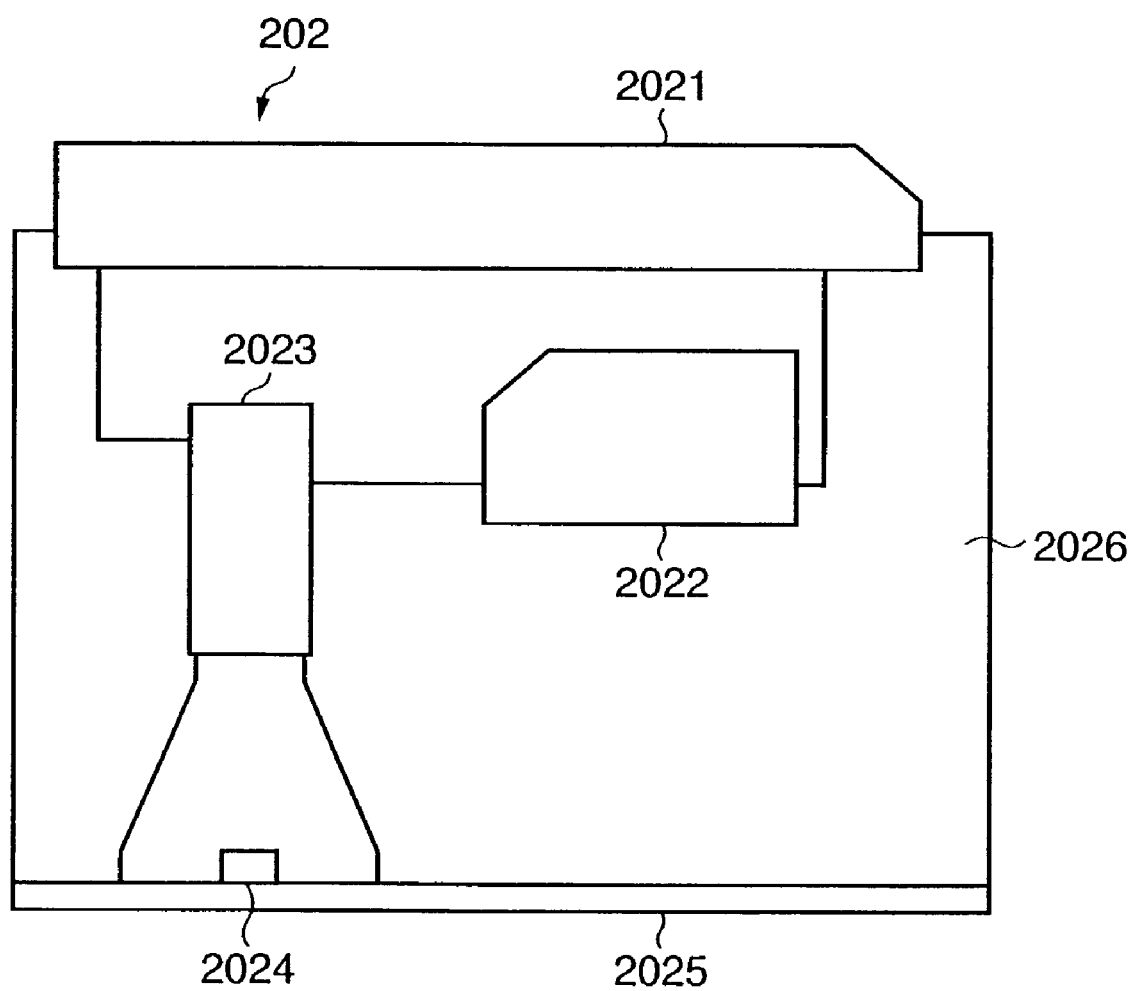

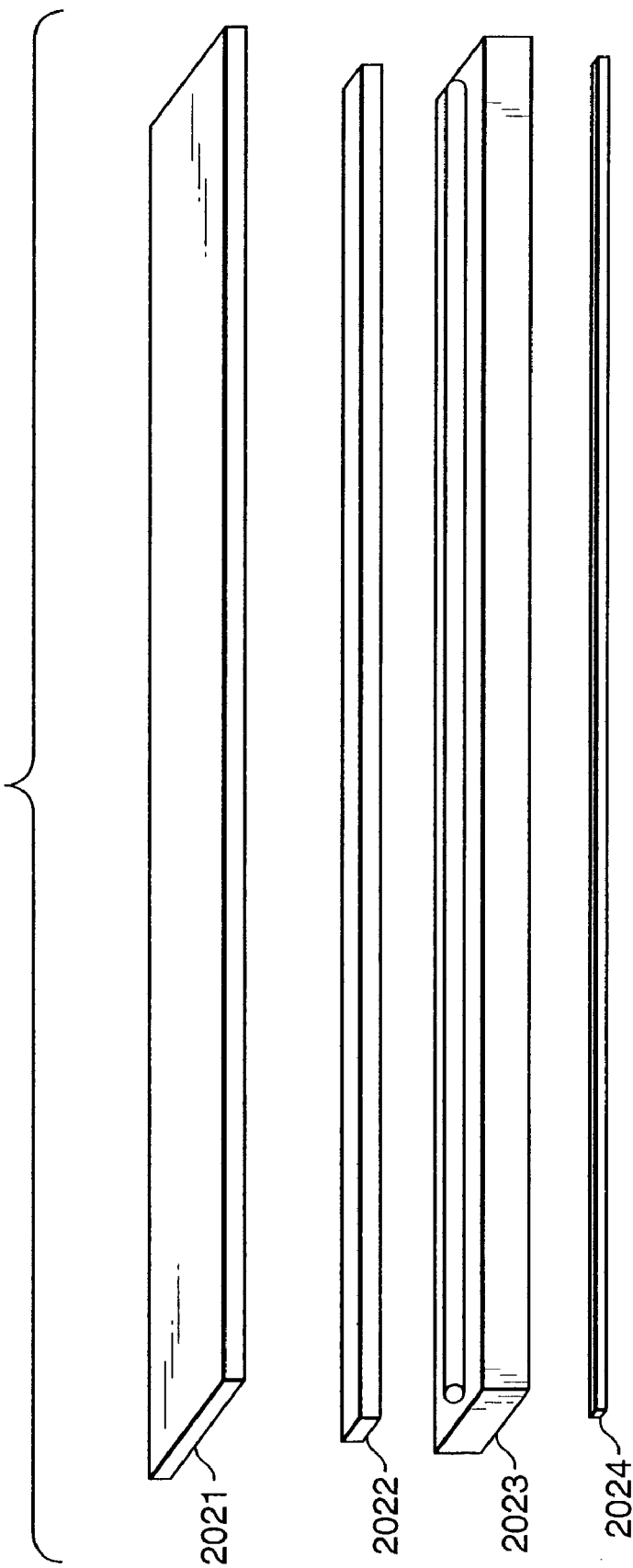

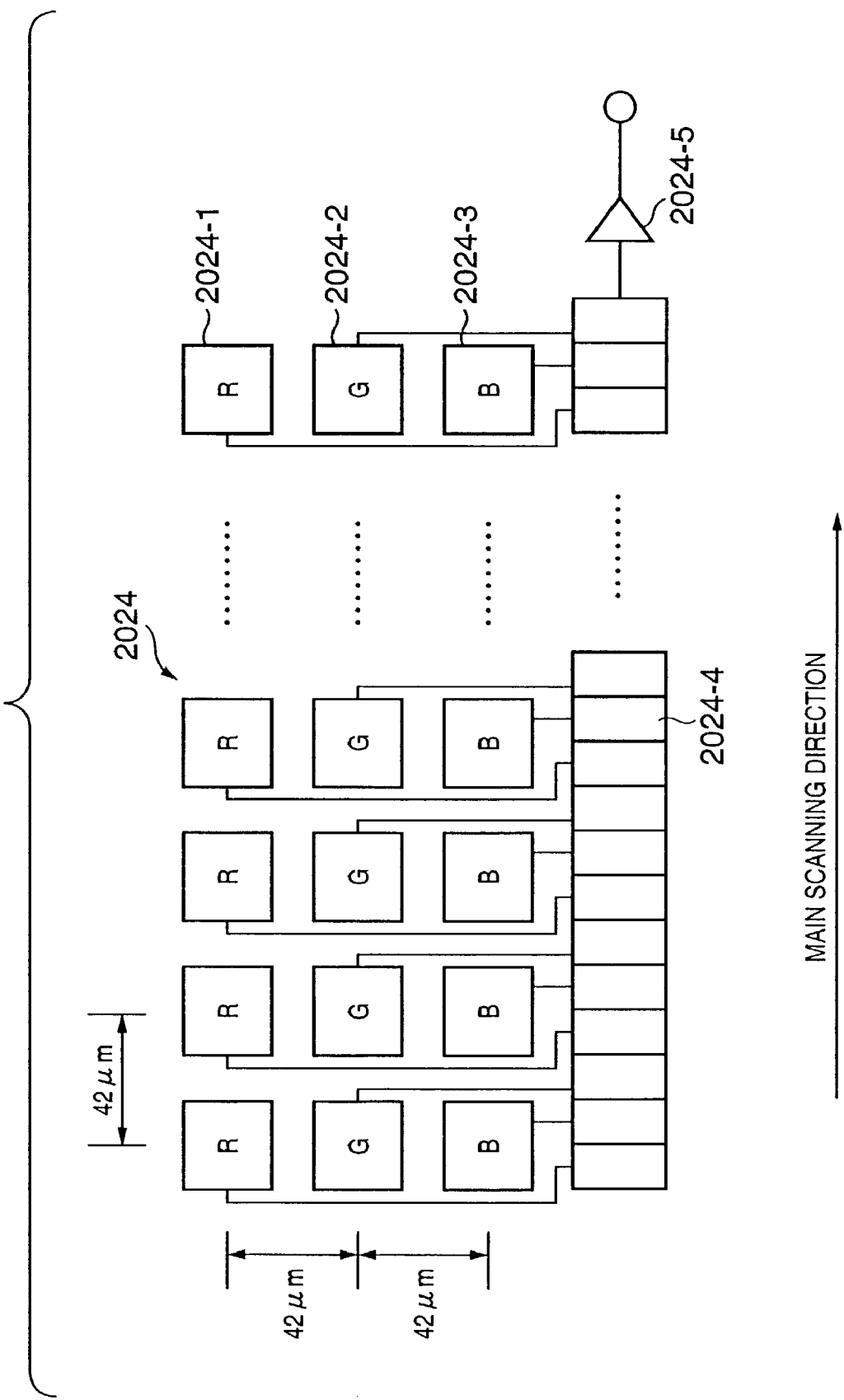

| x-AXIS SECTION | SECTION n | COEFFICIENT A kn | COEFFICIENT B kn | CORRECTION FUNCTION |
|---|---|---|---|---|
| $0 \leq X < x1$ | 1 | A1 | B1 | $Y = A1 * X + B1$ |
| $x1 \leq X < x2$ | 2 | A2 | B2 | $Y = A2 * X + B2$ |
| $x2 \leq X < x3$ | 3 | A3 | B3 | $Y = A3 * X + B3$ |
| $x3 \leq X \leq x4$ | 4 | A4 | B4 | $Y = A4 * X + B4$ |

PROCESSING OF SIGNALS FROM IMAGE SENSING APPARATUS WHOSE IMAGE SENSING AREA INCLUDES A PLURALITY OF AREAS

FIELD OF THE INVENTION

The present invention relates to an image processing apparatus having an image sensing apparatus and a correction method and, more particularly, to an image processing apparatus in which an image sensing apparatus has a plurality of areas each including a plurality of pixels and processes signals output from the plurality of areas, and a correction method.

BACKGROUND OF THE INVENTION

Contact image sensors (CISs) have recently been developed and put into practical use along with reductions in size and weight in a scanner apparatus for inputting an image to a personal computer and the document reader of a facsimile apparatus. The contact image sensor is formed from a light source, rod lenses which implement a ×1 erect optical system, and a one-dimensional light-receiving sensor whose effective width is substantially the same as the maximum width of a document to be read. The CIS can shorten the optical path length of an optical system, compared to an optical system which uses a lens called a reduction optical system to reduce the main scanning width of a document to be read to a fraction of the original width and reads the image by a one-dimensional CCD sensor or the like. Accordingly, the CIS can implement a small-size, lightweight document reader.

With the recent advance in semiconductor process and production technique, CISs have been adopted in A4-size consumer scanners. With low cost and a small light quantity from a light source, the use of CISs in high-speed image reading apparatuses such as a copying machine is also being examined.

A CIS requires a length equal to the width of a document image in reading an image. Forming a sensor with this length from one sensor chip is less advantageous in terms of the technique and cost. The CIS generally ensures a reading length equal to the document image width by arraying a plurality of sensor chips.

In a copying machine using a CCD image sensor, a CCD image sensor which is divided into two blocks at the center and reads out signals from the two ends in order to cope with a high-speed copying machine has been studied.

In the CIS, the plurality of sensor chips are linearly arrayed, as described above. Image signals from the sensor chips undergo well-known shading correction to adjust their black and white levels. The white level is generally adjusted by pixel, and the black level is adjusted by chip, pixel, or the like, which are both known well. The known shading correction is a reading correction method which assumes an ideal linearity of a read image signal. If the linearity characteristics of the chips of a multi-chip vary, the image signal level also varies at the halftone level. The density is different between adjacent chips, seriously degrading the quality.

Even if the black and white levels are adjusted by known shading correction in the CCD image sensor which is divided into two blocks at the center and reads out signals from the two ends, the linearity characteristic varies between the right and left sides due to differences in read characteristics at the two ends and the characteristics of a plurality of amplifiers. The levels of read signals differ from each other at the halftone level, resulting in a density difference and serious degradation in image quality. The density difference and quality degradation are conspicuous at the central boundary.

In general, these problems of the above-mentioned CCD image sensor have been solved by performing linearity correction using an LUT (Look Up Table) stored in a known ROM or RAM.

An LUT can realize arbitrary signal conversion by supplying an input signal as an address and reading out data stored at the address as an output signal. When the number of signals to be corrected is small, the correction method by signal conversion using the LUT is an ideal correction method.

However, when the correction method using the LUT is directly used in a color CIS with an array of 16 sensor chips, 16 chip×3 colors=a total of 48 LUTs are required. This leads to an impractically large-scale circuit regardless of whether the LUTs are constituted by discrete memories or incorporated in an ASIC.

When the conventional ODD/EVEN output (i.e., odd- and even-numbered pixels are read using different reading systems) is executed from two ends in a CCD image sensor which reads out signals from two ends, a monochrome image requires four LUTs, and a color image requires 12 LUTs, which is three times the number of LUTs for a monochrome image. A large number of LUTs cannot be ignored, either.

In short, output variations of a plurality of systems with different linearity characteristics that cannot be completely corrected by known shading correction, e.g., halftone linearity variations of a plurality of chips, blocks, or output systems with different characteristics are closed up as a result of implementing the multi-chip of a CIS or multi-read of a high-speed CCD. Especially for a color image, difficulty lies three times.

At present, the reader of a copying machine or the like is normally OFF for power saving and low power consumption. Even if the user wants to activate the copying machine and read a document as quickly as possible, a time of about 5 sec is taken for calculating LUT curves and writing the curves to RAM by the CPU even in the use of the simplest straight line in an arrangement where LUTs are prepared for the number of chips, blocks, or output systems subjected to linearity correction. Also from this viewpoint, the use of many LUTs is undesirable.

SUMMARY OF THE INVENTION

According to the present invention, an image processing apparatus comprises: an image sensor formed from a plurality of areas each including a plurality of pixels; and a corrector adapted to correct signals output from the plurality of areas of the image sensor, wherein the corrector has a plurality of correction data smaller in number than the areas, and performs correction by selectively using any one of the plurality of correction data for each area of the image sensor.

According to the present invention, an image processing apparatus comprises: an image sensor formed from a plurality of areas each including a plurality of pixels; a corrector adapted to correct signals from the plurality of areas of the image sensor; and a density reference member having a white reference area and a halftone gray reference area, wherein the corrector has a plurality of correction data smaller in number than the areas of a sensor chip, and executes first correction of performing shading correction on the basis of a signal obtained by reading the white reference area by the image sensor, and second correction (64a) of performing correction by selectively using the correction data for each area of the image sensor on the basis of a signal obtained by reading the halftone gray reference area by the image sensor.

Further, an image processing apparatus comprises: an image sensor formed from a plurality of areas each including a plurality of pixels; and a corrector adapted to correct linearity of signals output from the plurality of areas, wherein the corrector includes: a multiplier which multiplies the signals output from the plurality of areas by a coefficient; and an adder which adds a coefficient to the signals output from the plurality of areas.

Furthermore, a correction method of correcting image data obtained from an image sensor formed from a plurality of areas each including a plurality of pixels, comprises the steps of: reading a predetermined halftone image by the image sensor; selecting one of a plurality of correction data smaller in number than the plurality of areas for each of the plurality of areas on the basis of a signal level of the read image; storing correspondences between the plurality of areas and selected correction data; determining which of the areas outputs image data from the image sensor; and performing correction using correction data corresponding to the determined area.

Further, a correction method of correcting image data obtained from an image sensor formed from a plurality of areas each including a plurality of pixels, comprises the steps of: reading a predetermined halftone image by the image sensor; calculating a coefficient set used for correction for each of the plurality of areas on the basis of a signal level of the read image; storing correspondences between the plurality of areas and calculated coefficient sets; determining which of the areas outputs image data from the image sensor; selecting one of the stored coefficient sets on the basis of the determined area and the signal level of the image data; and correcting signals output from the plurality of areas by using coefficients of the selected coefficient set, wherein the correcting step includes: a step of multiplying the signals output from the plurality of areas by the coefficients of the selected coefficient set; and a step of adding the coefficients of the selected coefficient set to the signals output from the plurality of areas.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a block diagram showing the arrangement of part of the image processing apparatus according to the first embodiment of the present invention;

FIG. 7 is a block diagram showing the arrangement of a luminance signal conversion block according to the first embodiment of the present invention;

FIG. 12 is a view showing the arrangement of a CIS;

FIG. 13 is a perspective view showing the CIS in FIG. 12;

FIG. 14 is a schematic view showing the arrangement of one sensor chip which constitutes the multi-chip sensor according to the second embodiment of the present invention;

DETAILED DESCRIPTION OF THE PREFERRED EMBODIMENTS

Preferred embodiments of the present invention will be described in detail in accordance with the accompanying drawings.

First Embodiment

Figure 1:
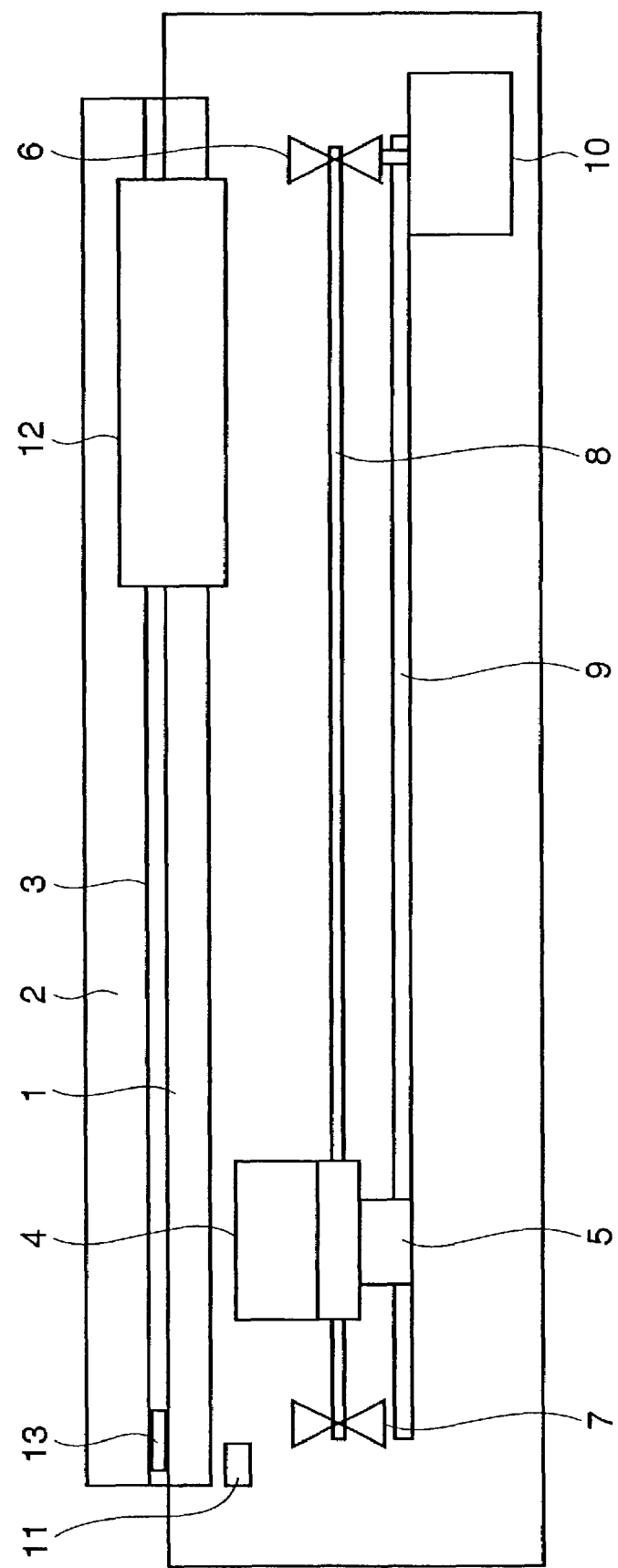
FIG. 1 is a schematic view showing the image reader of an image processing apparatus according to a first embodiment of the present invention.

The arrangement of the image reader of an image processing apparatus according to the first embodiment will be described with reference to FIG. 1.

Reference numeral 1 denotes a platen glass on which a document is set; 2, a platen cover which presses the platen glass and can be opened/closed; 3, a document set on the platen glass; 4, a contact image sensor (to be referred to as a "CIS" hereinafter) serving as a scanning optical system for reading the image of the document 3; 5, a carriage which holds the CIS; 9, a shaft serving as a guide when the carriage is moved in the sub-scanning direction in reading a document; 8, a timing belt fixed to the carriage 5; 6 and 7, pulleys which are arranged at the two ends of the timing belt so as to smoothly move the timing belt 8; 10, a stepping motor which is connected to either the pulley 6 or 7 and drives the pulley 6 or 7; 11, a home position sensor for detecting the sub-scanning position of the carriage 5 held by the CIS 4; 13, a density reference plate which is attached to the end of the home position sensor 11 on the platen glass 1 and serves as a reference for adjustment control of the light quantity and reference density read operation; and 12, an operation unit which is constituted by a switch for operating the image processing apparatus and a display for displaying the state of the image reader. Operation conditions are set and an operation is selected on the basis of an input signal from the operation unit 12.

Figure 2:
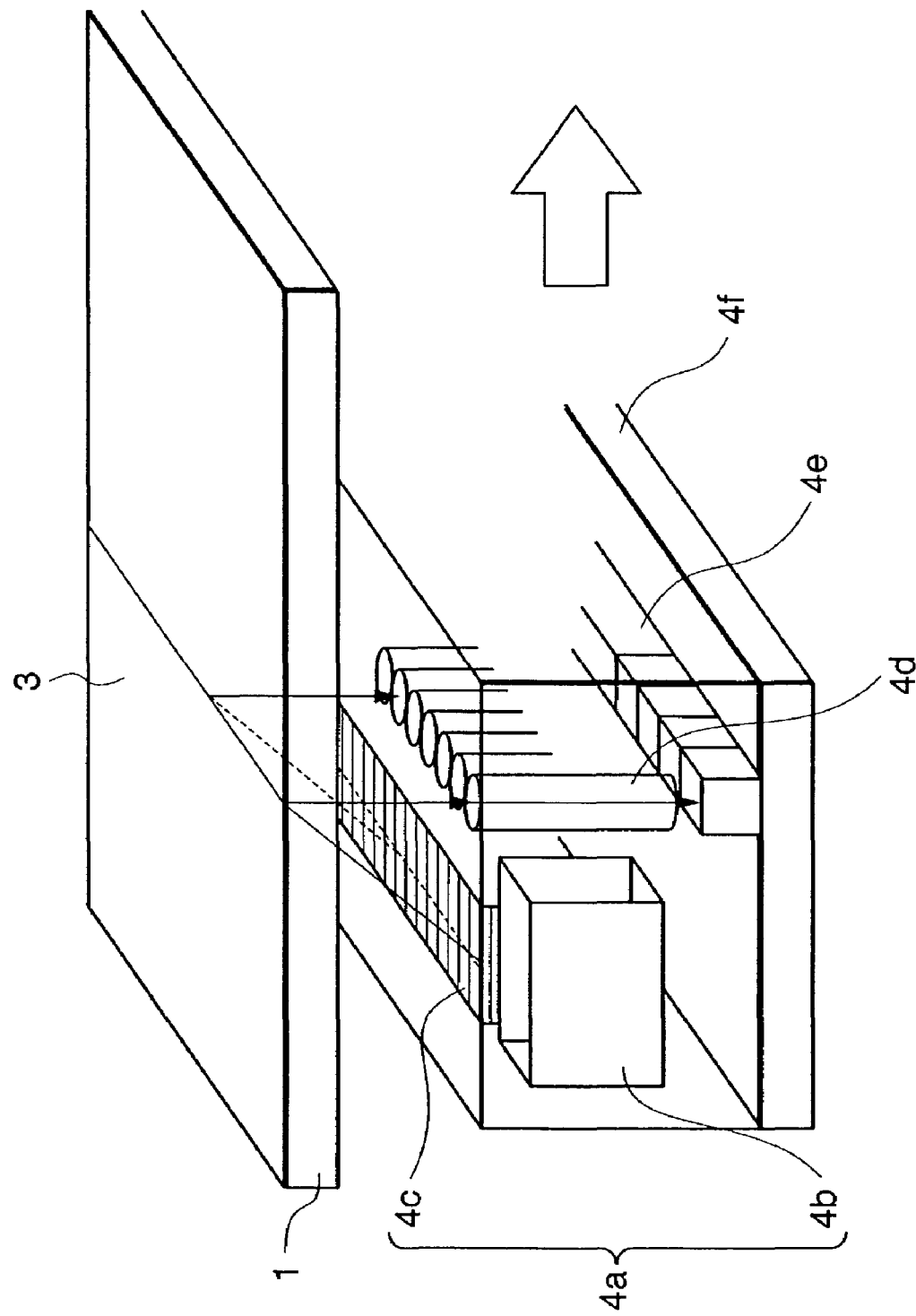
FIG. 2 is a perspective view showing the arrangement of part of a contact image sensor.

The arrangement of the CIS 4 will be described in detail with reference to FIG. 2.

Reference numeral 4a denotes a line light source unit which is made up of an LED light source unit 4b arranged at the end of the light source unit 4a, and a light guide 4c for uniformly diffusing light from the LED light source unit 4b in the main scanning direction.

Irradiation light emerging from the light guide 4c is reflected by the document 3 on the platen glass 1. The reflected light forms via a SELFOC lens array 4d an image on a multi-chip sensor 4e which is fixed to a substrate 4f and obtained by arraying a plurality of sensor chips in the main scanning direction.

The light of the formed image is photoelectrically converted by the multi-chip sensor 4e, and sequentially output as image signals.

The light intensity of the LED light source unit 4b is controlled by a constant current circuit (to be described in detail later) controllable by a constant current. The ON time of the LED light source unit 4b is controlled by pulse width modulation within the read time of one line of the multi-chip sensor 4e, thereby controlling the light quantity incident on the multi-chip sensor 4e.

The multi-chip sensor 4e will be explained in detail with reference to FIG. 3.

In the multi-chip sensor 4e adopted in the first embodiment, about 650 pixels are arrayed in the main scanning direction per sensor chip, and eight sensor chips of this type are arrayed in the main scanning direction.

This arrangement enables reading one line (A4-size, 210 mm-wide document) at a resolution of 600 dpi.

In order to drive the multi-chip sensor 4e, a driving circuit 21 uses a driving clock pulse for driving the multi-chip sensor 4e so as to read all pixels which constitute one line within a predetermined time, a reset pulse for resetting an output value every pixel in outputting charges from the pixel, and a horizontal sync signal serving as a trigger which starts read of one line.

Image signals are output from respective pixels in synchronism with the timings of these pulses, and sequentially output via an output circuit 41 having an AGC circuit, A/D conversion circuit, and the like.

The image processor of the image processing apparatus which performs various image processes for an image signal output from the CIS 4 will be explained with reference to FIG. 4.

The output circuit 41 comprises an Automatic Gain Controller (AGC) circuit 41a which adjusts the gain of an image signal output from the CIS 4, and an A/D conversion circuit 41b which converts an analog signal into a digital signal.

Reference numeral 42 denotes an LED control circuit (to be described in detail later) which controls the light quantity of the LED light source unit 4b serving as a light source in the CIS 4. The LED control circuit 42 is constituted by a portion which controls to obtain a predetermined light quantity when the LED light source unit 4b is ON and an image signal is accumulated in the multi-chip sensor 4e, and to keep light sources ON at a predetermined light quantity ratio when light sources of a plurality of colors are ON, and a portion which controls the LED ON timing (PWM (Pulse Width Modulation circuit) control portion which turns on the LED for a predetermined time at a predetermined timing).

Reference numeral 43 denotes a control circuit which performs image processing for an image signal output from the output circuit 41, and controls the LED control circuit 42.

The control circuit 43 incorporates an image processing circuit 43a which executes correction such as shading correction and luminance correction for an image signal, an image processing memory 43b, a CPU 43c which controls the overall image processing apparatus, a control memory 43d, an interface circuit 43f, and a motor driving circuit 43e.

The CPU 43c sets various operation conditions of the image processing apparatus such as the offset value and gain value of the above-described output circuit 41, the PWM control value of the LED of the LED control circuit 42, various parameters for image processing to the image processing circuit 43a, and the interface conditions of the interface circuit 43f. Further, the CPU 43c controls the start and stop of the operation, and controls the interface with an external device.

The data bus of the CPU 43c allows reading out via the image processing circuit 43a image data which is processed by the image processing circuit 43a and stored in the image memory 43b.

In reading an image, the CPU 43c detects the reference position of the CIS 4 by using the home position sensor 11. The CPU 43c controls the motor driving circuit 43e and causes the stepping motor 10 to output a predetermined excitation pattern so as to move the CIS 4 at a predetermined speed in the sub-scanning direction in reading an image, thereby a desired image is read.

Control and operation concerning image reading and image processing of the image processing apparatus in the first embodiment will be described with reference to FIGS. 1 to 4.

In reading a document, start of reading operation is instructed via the operation unit 12. Whether the home position sensor 11 detects the position of the carriage 5 is checked. If the home position sensor 11 does not detect the position, the stepping motor 10 is driven. The motor is stopped at a position after the home position sensor 11 detects the position of the carriage 5 and the motor is further driven for a predetermined number of pulses. Then, the carriage 5 is located at the home position.

If the home position sensor 11 detects the carriage 5 from the beginning, the stepping motor 10 is driven in the sub-scanning direction. After the carriage 5 passes through the home position sensor 11 once, the stepping motor 10 is rotated in the reverse direction. The stepping motor 10 is stopped at a position after the home position sensor 11 detects the carriage 5 again and the motor 10 is further driven for a predetermined number of pulses. Then, the carriage 5 is located at the home position.

Before image reading starts, the PWM values for respective colors of the LED light source are set using the above-described density reference plate 13 at this position.

The PWM values are set by detecting the image signal value of the CIS 4. First, the offset value and gain value of the output circuit 41 are set to predetermined reference values, the light quantity ratio of the respective colors of the LED is set, and then the PWM values of the colors are set.

Next, the correction value for shading correction is set based on an image signal obtained by irradiating the density reference plate 13 in the set light quantity.

After the above operation is completed, the stepping motor 10 drives the carriage 5 in the sub-scanning direction to start reading a document image.

After reading starts, the optical image of a document is photoelectrically converted, and the image signal of the document image is processed.

The image signal is sampled, and then undergoes signal offset level correction and signal amplification processing in the output circuit 41. After analog signal processing ends, the image signal is converted into a digital signal by the A/D conversion circuit 41$b$, and the digital signal is output.

The digital image signal is stored in the image memory 43$b$ after processed with shading correction, spatial filter processing, magnification correction, luminance signal conversion, and binarization processing by the image processing circuit 43$a$ in the control circuit 43. Note that various image processing conditions and operation parameters described above can be set by the CPU 43$c$ in the control circuit 43.

Image data stored in the image memory 43$b$ is output via the interface circuit 43$f$ in synchronism with a control timing with an external device.

The LED control method of the LED light source unit 4$b$ will be described with reference to FIG. 5.

Figure 4:
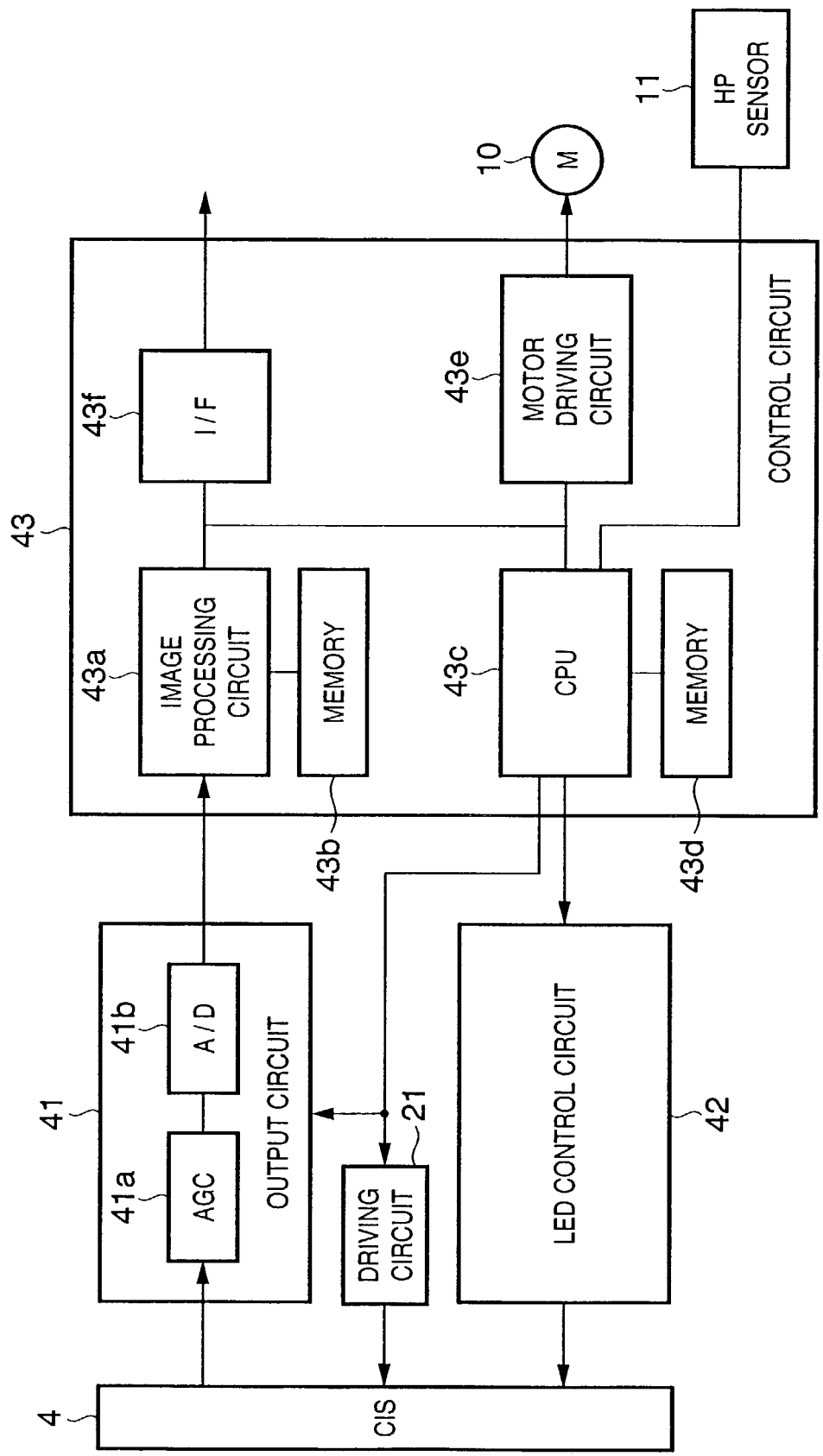
FIG. 4 is a block diagram mainly showing the arrangement of the image processor of the image processing apparatus according to the first embodiment of the present invention.

In FIG. 5, reference numeral 43 denotes the control circuit shown in FIG. 4. Of the arrangement shown in FIG. 4, only the CPU 43$c$ and control memory 43$d$ are illustrated. As described above, the control circuit 43 controls the whole image reading apparatus.

The LED light source unit 4$b$ has a Red LED, Green LED, and Blue LED. The LED control circuit 42 has LED driving units 42$a$, 42$b$, and 42$c$ each including a constant current circuit and switching circuit in correspondence with each LED of the LED light source unit 4$b$. The LED driving units 42$a$, 42$b$, and 42$c$ are independently connected to respective color LEDs (red, green, and blue).

All the LEDs receive a common potential. The constant current values of the constant current circuits, and switch-on times (ON times) in the LED driving units 42$a$, 42$b$, and 42$c$ can be changed by control signals based on image signals input from the multi-chip sensor 4$e$ to the control circuit 43.

Initial values in the control circuit 43 and the LED ON ratio can be set using the operation unit 12.

To make the explanation clear, the first embodiment is based on the following premise. However, this premise does not limit the present invention.

The LED light source unit 4$b$ is an LED light source (array type and light guide type) having R, G, and B (Red, Green, and Blue) wavelengths.

Light-receiving amounts pix_R, pix_G, and pix_B of the multi-chip sensor 4$e$ are proportional to LED light quantities l_R, l_G, and l_B. Since the light quantities are the products of light intensities (i_R, i_G, and i_B) and irradiation times (t_R, t_G, and t_B), $$\text{pix\_R} \propto \text{l\_R} = \text{i\_R} \times \text{t\_R}$$

$$\text{pix\_G} \propto \text{l\_G} = \text{i\_G} \times \text{t\_G}$$

$$\text{pix\_B} \propto \text{l\_B} = \text{i\_B} \times \text{t\_B}$$

hold. Constant current values which determine the light intensities of the respective LEDs and the ON times of the LEDs are independently stored. The LEDs are independently turned on and driven based on these values, and can emit desired light quantities. When the LED light source unit 4$b$ is turned on and image signals are accumulated in the multi-chip sensor 4$e$, the light source can be turned on so as to obtain a predetermined light quality. When light sources of a plurality of colors are turned on, they can be turned on at a predetermined light quantity ratio.

A portion which controls the LED ON timing is a pulse width modulation (PWM) control portion which turns on the LED for a predetermined time with reference to a predetermined timing.

An image output signal value output from the A/D conversion circuit 41$b$ is an 8-bit 256-level output using the output value of a white reference plate as 255 and the output value of a black reference plate (or light-off state) as 0.

The control circuit 43 performs software control mainly using the CPU 43$c$. However, control of the present invention may be realized by using hardware mainly using a gate array.

The detailed arrangement and operation of the image processing circuit 43$a$ will be described.

The arrangement will be first explained.

Figure 6:
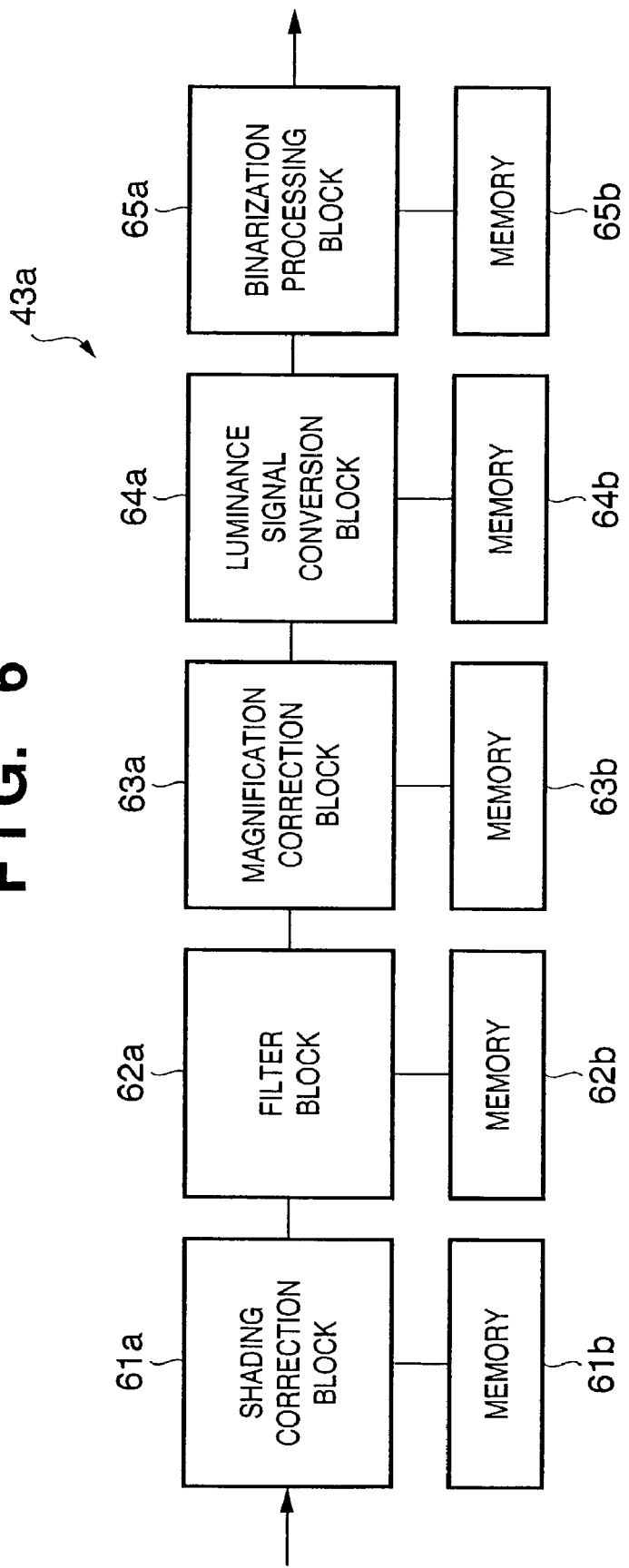
FIG. 6 is a block diagram showing the arrangement of an image processing circuit according to the first embodiment of the present invention.

As shown in FIG. 6, the image processing circuit 43$a$ is constituted by a shading correction block 61$a$, a filter block 62$a$, a magnification correction block 63$a$, a luminance signal conversion block 64$a$, a binarization processing block 65$a$, and memories 61$b$, 62$b$, 63$b$, 64$b$, and 65$b$ which correspond to the respective blocks and store image data, coefficients, and the like. Instead of arranging the memories 61$b$, 62$b$, 63$b$, 64$b$, and 65$b$ in the image processing circuit 43$a$, the memory 43$b$ can, for example, be utilized. In this case, memory capacities necessary for the blocks 61$a$ to 65$a$ are ensured in the memory 43$b$ in advance.

The memory 61$b$ of the shading correction block 61$a$, the memory 63$b$ of the magnification correction block 63$a$, and the memory 64$b$ of the luminance signal conversion block 64$a$ allow writing image data, reading out and writing data from the CPU 43$c$ of the control circuit 43.

FIG. 7 is a block diagram showing the detailed arrangement of the luminance signal conversion block 64$a$ in FIG. 6, and specifically shows a circuit block for converting input image luminance data of one pixel into corresponding density data.

The memory 64$b$ has three correction table memories 74$a$, 74$b$, and 74$c$ for different sensor chip characteristics. The luminance signal conversion block 64$a$ comprises an address counter 71 for counting the number of pixels, a selector 73 for switching and controlling accesses to the table memories 74$a$, 74$b$, and 74$c$ in accordance with the address counter value, and a setting register 72 for holding a comparison value to be compared with an output value from the address counter 71 and selection settings for the selector 73.

Luminance signal conversion operation will be explained.

Figure 8:
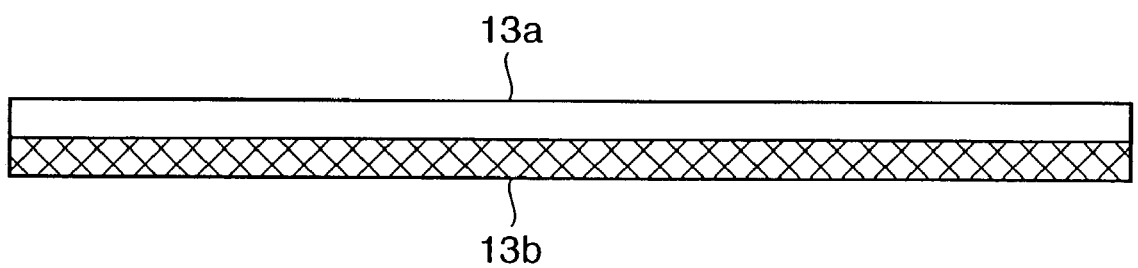
FIG. 8 is a view showing a density reference plate.

FIG. 8 shows the structure of the density reference plate 13. The density reference plate 13 is made up of two reference density areas: a white reference area 13*a* used for shading correction in reading an image and a halftone gray reference area 13*b* used to determine sensor chip characteristics.

Figure 25:
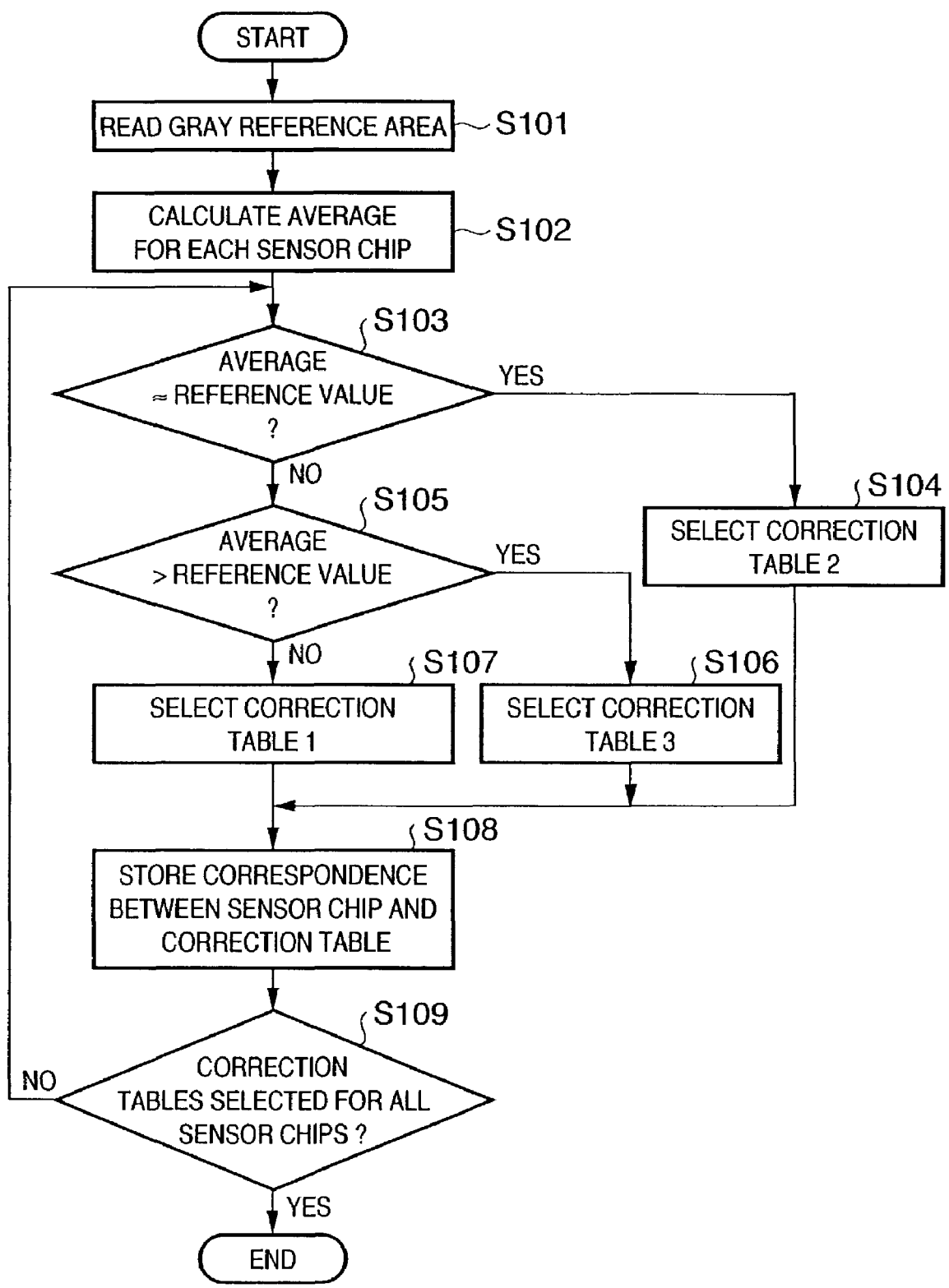
FIG. 25 is a flow chart showing processing of selecting a correction table used in a sensor chip according to the first embodiment of the present invention.

Setting of a correction table corresponding to a sensor chip will be explained with reference to the flow chart of FIG. 25. As described above, the white reference plate area 13*a* is read by the multi-chip sensor 4*e* to obtain shading correction data, and shading correction is done based on this data.

Thereafter, the halftone gray reference area 13*b* is read by the multi-chip sensor 4*e* (step S101), and the read image data is stored in the memory 63*b* of the magnification correction block 63*a*.

The CPU 43*c* in the control circuit 43 reads out image data stored in the memory 63*b*, and calculates the average of pixel data at a halftone density for each sensor chip (step S102). The calculated average data is stored in the memory 43*d*. The halftone gray reference value stored in the memory 43*d* is compared with the average of each sensor chip, and which of conversion data in the correction table memories 74*a*, 74*b*, and 74*c* is to be used is set for each memory chip (steps S013 to S107).

Figure 3:
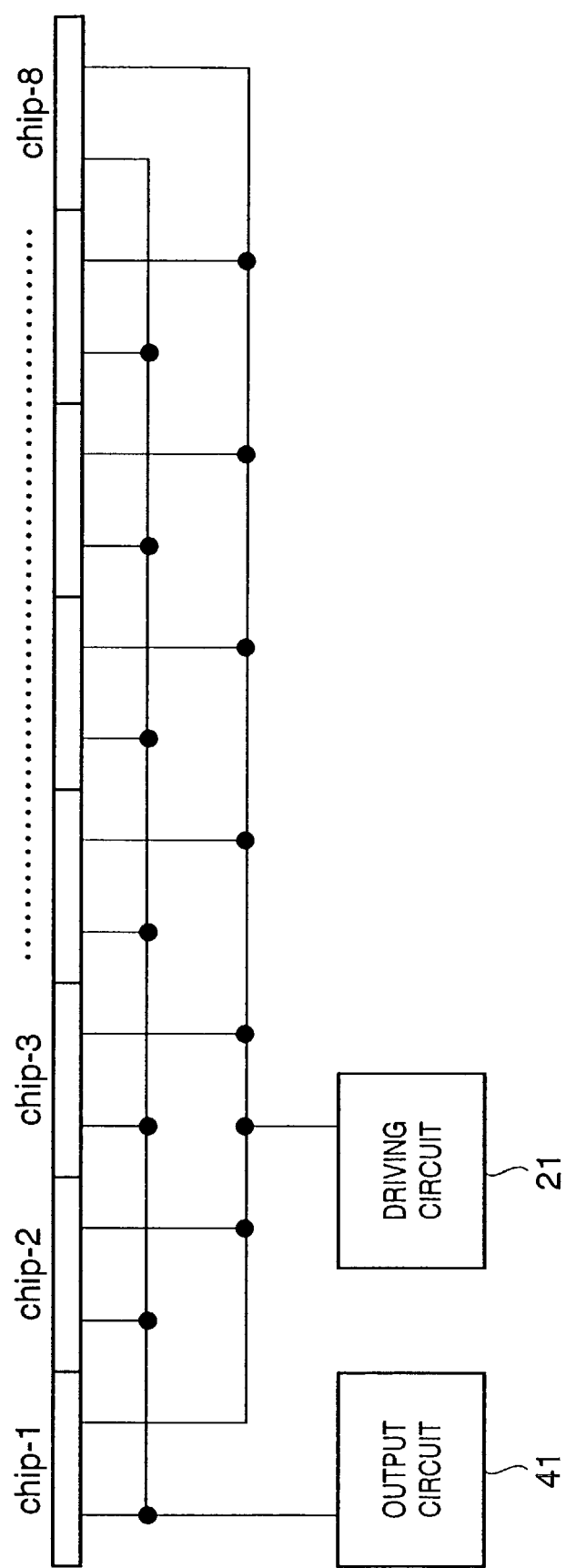
FIG. 3 is a block diagram showing the arrangement of a multi-chip sensor.

The multi-chip sensor 4*e* adopted in the first embodiment is made up of eight sensor chips, as shown in FIG. 3. Which of correction tables in the three correction table memories 74*a*, 74*b*, and 74*c* is to be used as a correction table for each of the eight sensor chips is set in the setting register 72 (step S108).

Figure 9C:
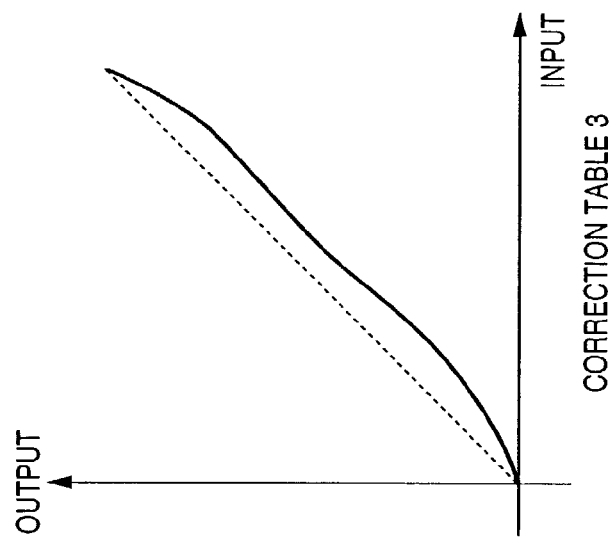
FIGS. 9A to 9C are graphs showing examples of the characteristic of a correction table according to the first embodiment of the present invention.
Figure 9B:
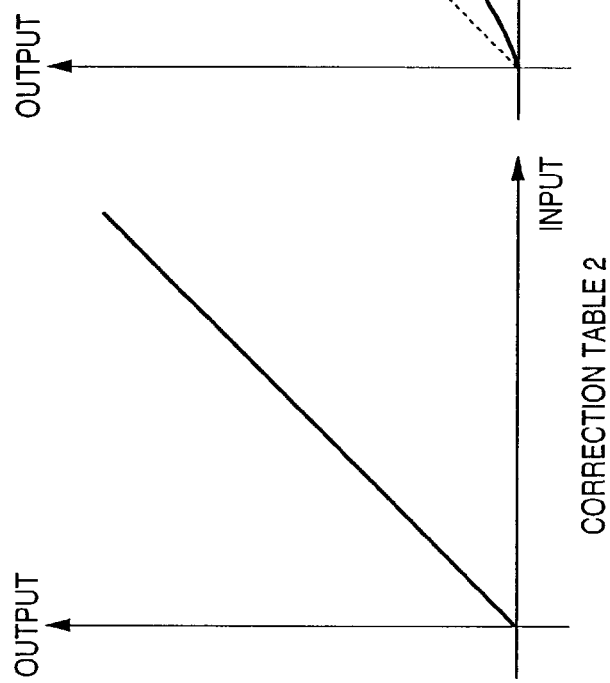
Figure 9A:
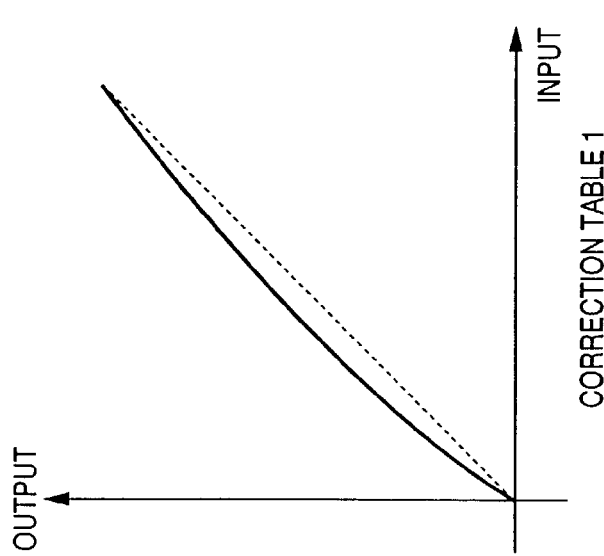

FIGS. 9A to 9C show examples of the correction characteristic of the correction table. FIG. 9B shows a table (correction table 2) whose correction characteristic is almost ideal. FIG. 9A shows a characteristic table (correction table 1) whose halftone image data is smaller than a reference value. FIG. 9C shows a characteristic table (correction table 3) whose halftone image data is larger than the reference value.

For example, if the halftone average of the first sensor chip is almost equal to the above-mentioned reference value in the memory (YES in step S103), correction table 2 is set (step S104). If the halftone average of the second sensor chip is larger than the above-mentioned reference value in the memory (YES in step S105), correction table 3 is set (step S106). If the halftone average of the third sensor chip is smaller than the above-mentioned reference value in the memory (NO in step S105), correction table 1 is set (step S107). In this way, which of correction tables stored in the three correction table memories 74*a*, 74*b*, and 74*c* is to be used as correction table data corresponding to each of the eight sensor chips is set. The setting information is stored in the setting register 72 of FIG. 7 (step S108). This operation is executed for all the sensor chips (step S109).

When the characteristic of the sensor chip is known in advance, a correction table may be selected and set for each sensor chip by using the operation unit 12.

In the first embodiment, a correction table is not set for each sensor chip, but a smaller number of correction tables than the number of sensor chips is set, as described above. Then, a plurality of sensor chips share the correction tables, which can prevent increasing the size of the image processing circuit 43*a* even with many sensor chips.

However, the first embodiment is not limited to the above arrangement, and a correction table may be set for each sensor chip.

As the power consumption of the image processing apparatus is reduced, degradation in the image quality of a halftone image cannot be prevented by only shading correction. In this case, the arrangement according to the first embodiment is very effective.

Figure 26:
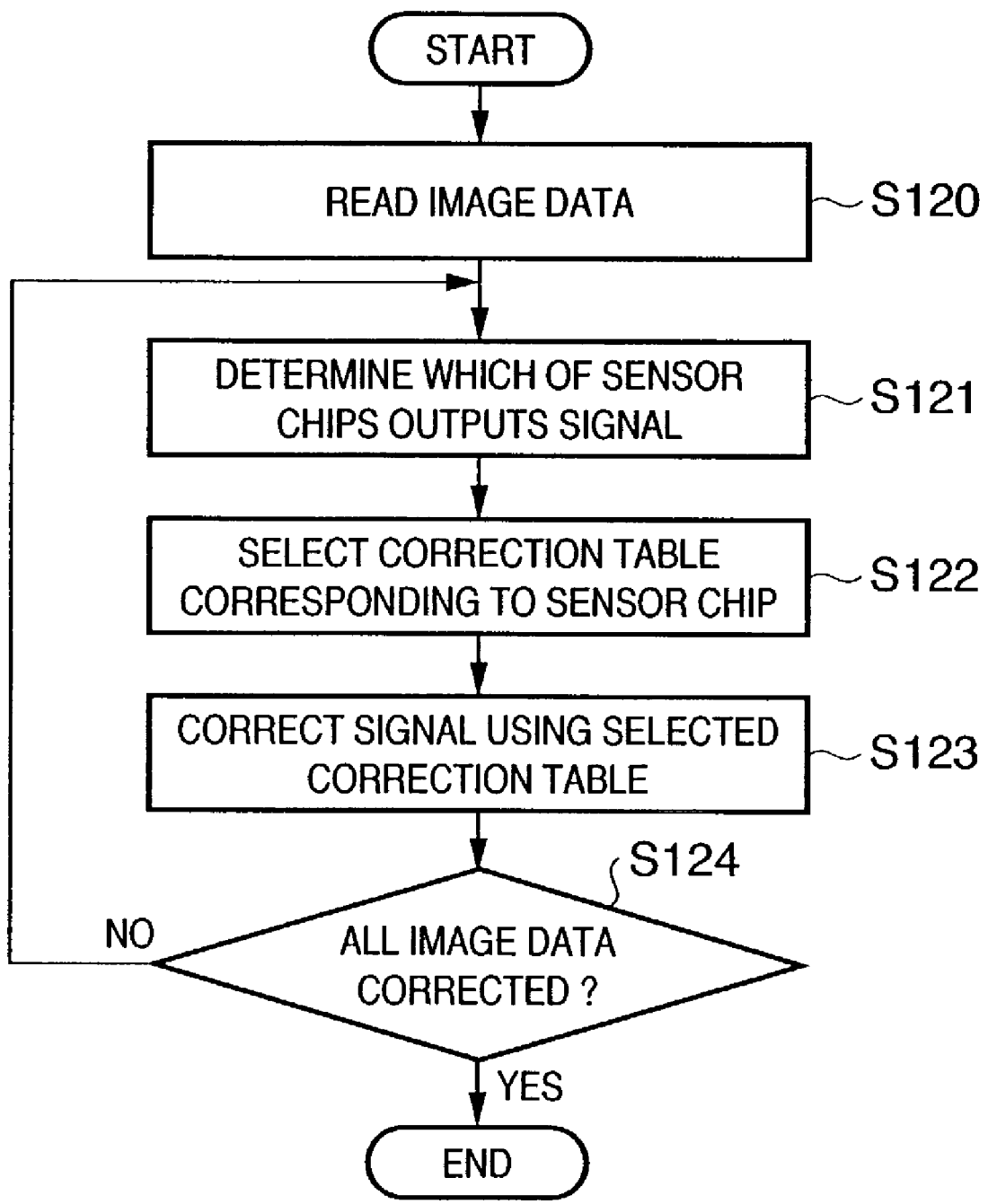
FIG. 26 is a flow chart showing linearity correction processing according to the first embodiment of the present invention.

The flow of an operation of the image processing circuit will be explained with reference to FIGS. 4, 6, and 26.

As described above, an image signal from the multi-chip sensor 4*e* that is converted into a digital signal by the A/D conversion circuit 41*b* is input to the image processing circuit 43*a* (step S120). The image signal undergoes shading correction in the shading correction block 61*a*, and edge emphasis processing or smoothing processing in the filter block 62*a*. Further, the image signal undergoes reduction/enlargement processing in the image magnification correction block 63*a*, and is input to the luminance signal conversion block 64*a*.

In the first embodiment, image data is processed as 8-bit data, and image data of one line are sequentially processed in synchronism with a horizontal sync signal.

Image data of one line are input to the luminance signal conversion block 64*a* in an order of pixels from one side of the eight sensor chips. At this time, the number of pixels is counted by the address counter 71. Written in the setting register 72 is the number of a correction table memory to be selected (step S122) when the address value of the first pixel of each sensor chip coincides with a setting value set in the setting register 72 (step S121).

For example, if the first chip of the multi-chip sensor corresponds to setting of correction table memory 1, all the image signals from the first chip are corrected in accordance with correction table 1 of correction table memory 1 (74*a*) (step S123). If the count value of the address counter 71 coincides with the first address of the second chip and this count value is set to selection of correction table 2, all the image signals from the second chip are corrected in accordance with correction table 2 of correction table memory 2 (74*b*) (step S123). This operation is repeated until all the image signals are processed (step S124).

In this fashion, image signals from the 8-chip sensor are corrected based on characteristics which are suitable for respective chip characteristics. Therefore, image data can be corrected even at the halftone portion of an image with less density nonuniformity caused by the characteristic difference between chips.

In the first embodiment, a case in which the multi-chip sensor 4*e* is formed from eight chips is explained. However, the number of chips is a design rule, and an arbitrary number of chips can be connected.

Further, the number of correction tables is three in the first embodiment, but is not limited to this, and an arbitrary number of correction tables can be set. Also in this case, a correction table to be used may be set in accordance with the intermediate value of the signal value of the halftone gray reference area 13*b* output from each sensor chip.

The first embodiment has exemplified the use of the CIS, but is not limited to this. For example, the linearity correction method of the first embodiment can be preferably applied in the use of a CCD or MOS type image sensing element which is divided into a plurality of areas and reads out signals from the respective areas via different output systems.

Second Embodiment

Figure 10:
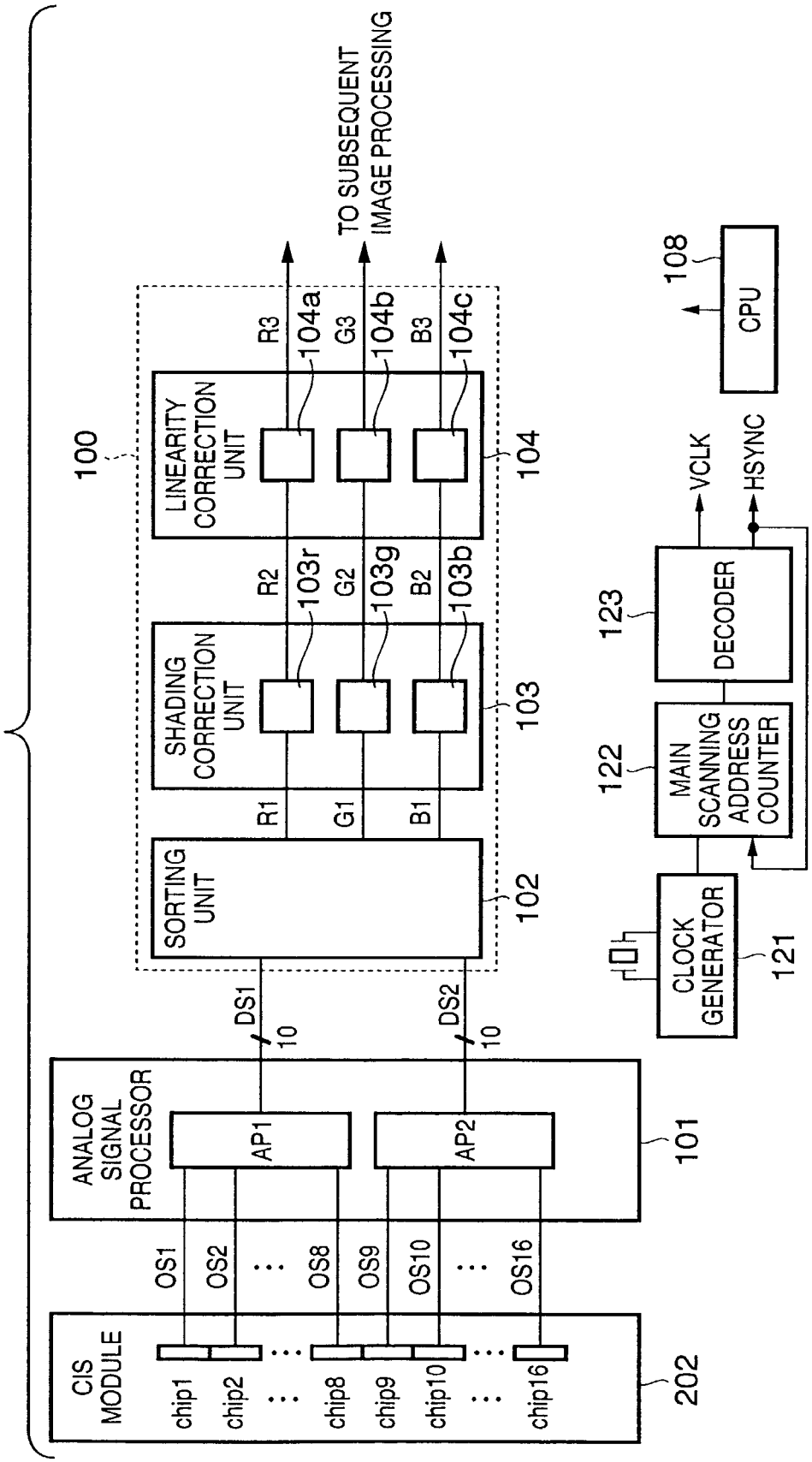
FIG. 10 is a block diagram showing the arrangement of an image processing apparatus according to a second embodiment of the present invention.

FIG. 10 is a block diagram showing an image processing apparatus according to the second embodiment of the present invention.

Figure 11:
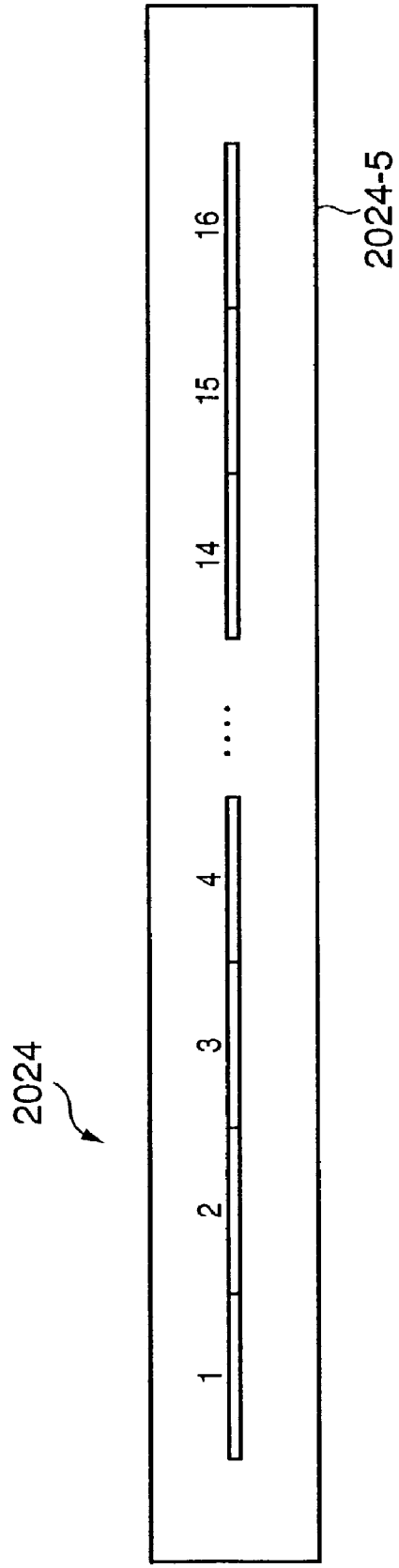
FIG. 11 is a conceptual view showing a multi-chip sensor according to the second embodiment of the present invention.

Reference numeral 202 denotes a contact image sensor (CIS) module having a multi-chip sensor functioning as an image sensing unit which includes a plurality of pixels and a plurality of output units for outputting signals from the pixels. In a multi-chip sensor 2024, as shown in FIG. 11, a plurality of sensor chips (chip1 to chip16 in FIG. 11) on each of which a plurality of pixels are arrayed in one direction (main scanning direction) are arrayed on a mounting substrate 2025 in the same direction as that of the pixel array.

The arrangement of the CIS module 202 in the second embodiment will be described.

In the CIS module 202, as shown in FIG. 12, a cover glass 2021, an illumination light source 2022 formed from an LED, a ×1 imaging lens 2023, such as a SELFOC lens, and the multi-chip sensor 2024 are mounted on the substrate 2025. These parts are attached to a mold 2026 to form the integral CIS module 202.

FIG. 13 is a perspective view showing the CIS module 202 of FIG. 12. The same reference numerals as in FIG. 12 denote the same parts.

FIG. 14 shows details of one sensor chip (e.g., chip1) of the multi-chip sensor 2024.

In FIG. 14, each rectangle represents a reading pixel. For a 600-dpi ×1 reading multi-chip sensor, the pixel interval is 42×42 μm. Reference numeral 2024-1 denotes a pixel array for reading red (R) light; and 2024-2 and 2024-3, pixel arrays for reading green (G) light and blue (B) light, respectively.

Each pixel on the pixel array 2024-1 is covered with an R color filter; each pixel on the pixel array 2024-2, with a G color filter; and each pixel on the pixel array 2024-3, with a B color filter. A photodiode as a photoelectric converter is formed below each color filter. As described above, for 600 dpi, the three pixel arrays are formed at a pixel interval of 42 μm in the sub-scanning direction (direction in which a document or the multi-chip sensor 2024 moves). The pixel pitch in the main scanning direction is also 42 μm.

The photodiode generates charges corresponding to an incident light quantity during the accumulation time.

The three pixel arrays having different optical characteristics form a monolithic structure on a single silicon chip so as to arrange the pixel arrays parallel to each other in order to read the same line of a document by the R, G, and B pixel arrays.

Reference numeral 2024-4 denotes a CCD shift register serving as a charge transfer unit. By applying shift pulses to pixels at the first timing of one line, charges move from the pixels of the pixel arrays 2024-1, 2024-2, and 2024-3 to the charge transfer unit 2024-4.

By applying a transfer clock to the charge transfer unit 2024-4, charges which have moved to the charge transfer unit 2024-4 are transferred in time division to an output amplifier unit 2024-5 in an order of G, B, R, G, B, R, . . . . The output amplifier unit 2024-5 converts the charges into voltages, and sequentially outputs signals as voltage outputs in an order of G, B, R, G, B, R, . . . .

An analog signal processor 101 in FIG. 10 comprises a gain offset adjustment circuit which adjusts the gain offsets of signals from respective output units (OS1 to OS16), and an A/D converter which converts an analog signal into a digital signal.

The analog signal processor 101 has two analog processors (AP1 and AP2). Each analog processor receives analog signals via eight channels, multiplexes the signals, and outputs a digital signal via one channel in time division.

A sorting unit 102 converts input digital signals into appropriately sorted R, G, and B digital signals. First, signals from an R pixel array, signals from a G pixel array, and signals from a B pixel array on chip1 are output in parallel pixel by pixel until signals of all the pixels on chip1 is read out. Then, signals from an R pixel array, signals from a G pixel array, and signals from a B pixel array on chip2 are output in parallel pixel by pixel. In this manner, color signals are sequentially output in parallel from every sensor chip.

A shading correction unit 103 performs shading correction for each color. The shading correction unit 103 has shading correction circuits for the respective colors (103*r*, 103*g*, and 103*b*).

A CPU 108 controls the entire image processing apparatus.

A linearity correction unit 104 is a characteristic feature of the second embodiment, and performs linearity correction for digital signals having undergone shading correction by sensor chip and color, i.e., for a plurality of image signals having different linearity characteristics. The second embodiment adopts (a total of three) linearity correction circuits (104*a* to 104*c*) for the respective colors.

The above arrangement is the best in consideration of the balance between the circuit scale and the processing speed. However, the present invention is not limited to this arrangement, and linearity correction circuits may be arranged for respective sensor chips (i.e., 16 linearity correction circuits are prepared), or linearity correction circuits may be arranged for respective sensor chips and colors (i.e., 48 linearity correction circuits are prepared). Such an arrangement does not require the following main scanning position determination unit.

For a monochrome image, one linearity correction circuit is desirably arranged as a whole in consideration of the balance between the circuit scale and the processing speed. However, a linearity correction circuit may be arranged for each sensor chip.

Figures 15A, 15B:
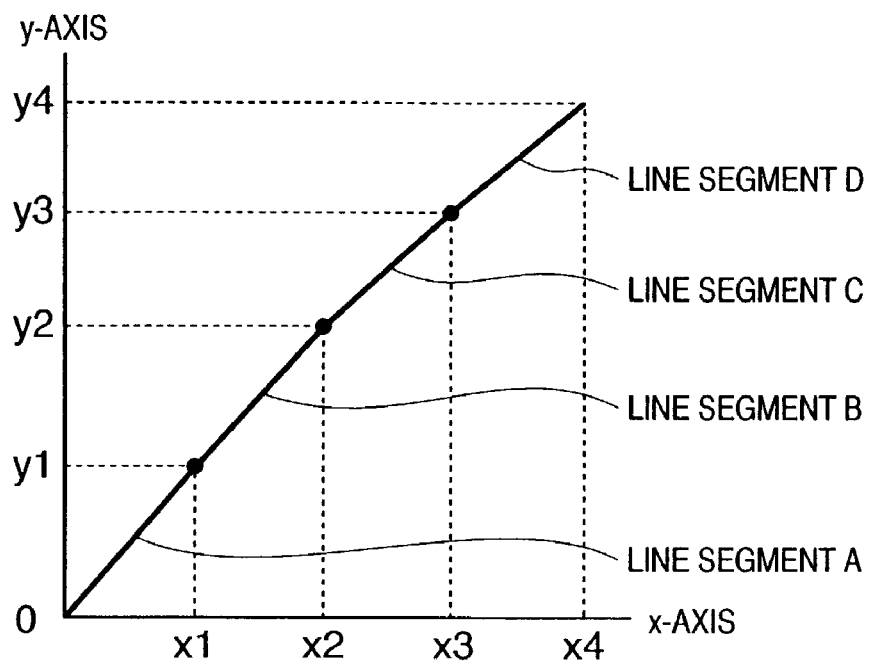
FIGS. 15A and 15B are a graph and table for explaining linearity correction according to the second embodiment of the present invention.

FIGS. 15A and 15B are a graph and table for explaining the concept of linearity correction.

An input signal is represented by an x-coordinate, and a corresponding output signal is represented by a y-coordinate. In FIG. 15A, the x-axis is divided into four domains of definition. For a 10-bit input signal, x takes a value of 0 to 1023.

A linear function is defined as follows for each domain of definition.

$$0 \leq X < x1: Y = A1*X + B1;$$

$$x1 \leq X < x2: Y = A2*X + B2;$$

$$x2 \leq X < x3: Y = A3*X + B3;$$

$$x3 \leq X < x4: Y = A4*X + B4;$$

where X is an input signal, Y is an output signal, A1 to A4 are multiplicative coefficients, and B1 to B4 are additive factors of the y-intercept of the linear function. Each linear function can be expressed by a straight line, but is a line segment because the domain of definition is determined. The CPU 108 sets respective line segments to be continuous. These settings are shown in the table of FIG. 15B.

As a result, a line graph which passes through coordinates (0,0) and (1023,1023), slightly projects upward, and is broken at three points is realized as shown in the graph of FIG. 15A.

Setting the linearity correction function enables linearity correction. A curved graph can achieve more appropriate correction than a line graph. However, the deviation from the ideal straight line of the linearity of each signal is not large in actual measurement, and is about 8 levels at the center for 10 bits or 2 levels for 8 bits. The linearity can be satisfactorily corrected by a line graph.

In order to correct the linearity by a four-seguement-line graph, the domain of definition is divided into four. In the arrangement of the second embodiment, a line graph having an arbitrary number of line segments can also be realized by continuously connecting the line segments.

Figure 27:
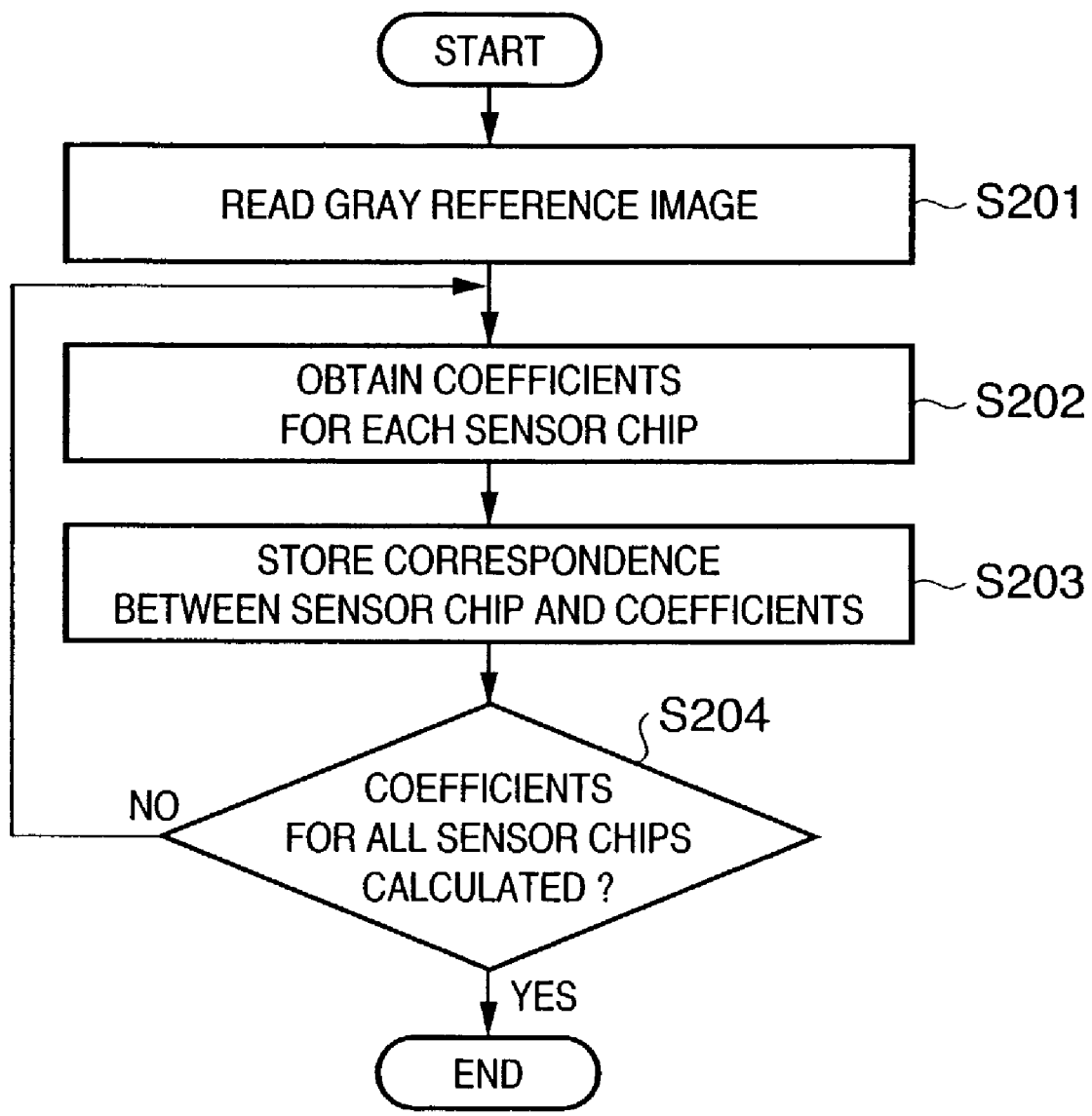
FIG. 27 is a flow chart showing processing of calculating a correction coefficient used in a sensor chip according to the second embodiment of the present invention.

A method of obtaining the linearity correction function as shown in FIGS. 15A and 15B will be explained with reference to the flow chart of FIG. 27.

In linearity correction, a halftone chart is read by the CIS module 202 in order to obtain halftone correction data (step S201). First, a chart with a density D of 0.3 is prepared and read, shading correction (to be described later) is performed, and a chart reading level is attained for each color of each of 16 chips. Then, the level averages of all the 16 chips are obtained for respective R, G, and B colors. The obtained averages are defined as the target values of the respective colors, and made to correspond to signal levels in the CPU 108 such that the obtained target values are output in response to the signal levels of the respective chips when the D=0.3 chart is read.

To correct a dark portion, a chart with a density D of 1.1 is prepared, shading correction is performed, and a chart reading level is attained for each color of each of 16 chips. The level averages of all the 16 chips are obtained for respective R, G, and B colors. The obtained averages are defined as the target values of the respective colors, and made to correspond to signal levels in the CPU 108 such that the obtained target values are output in response to the signal levels of the respective chips when the D=1.1 chart is read.

To correct a bright portion, a chart with a density D of 0.2 is prepared, shading correction is performed, and a chart reading level is attained for each color of each of 16 chips. The level averages of all the 16 chips are obtained for respective R, G, and B colors. The obtained averages are defined as the target values of the respective colors, and made to correspond to signal levels in the CPU 108 such that the obtained target values are output in response to the signal levels of the respective chips when the D=0.2 chart is read.

As a result, input and output values are attained for the black level, D=1.1, D=0.3, D=0.2, and white level. Coefficients (An and Bn) representing a linearity correction function which expresses a line segment between input and output values are calculated based on the input and output values. These correction coefficients are obtained for each color of each chip (step S202). The calculated correction coefficients are stored in correspondence with each sensor chip (step S203). In this manner, correction coefficients for all the sensor chips are calculated and stored (step S204). The use of this function enables correcting the linearity so as to make the reading levels of the chips approach each other.

The operation of obtaining the linearity correction function may be done in shipping from a factory (after shipping, the same value is used), or every document reading operation.

Figure 16:
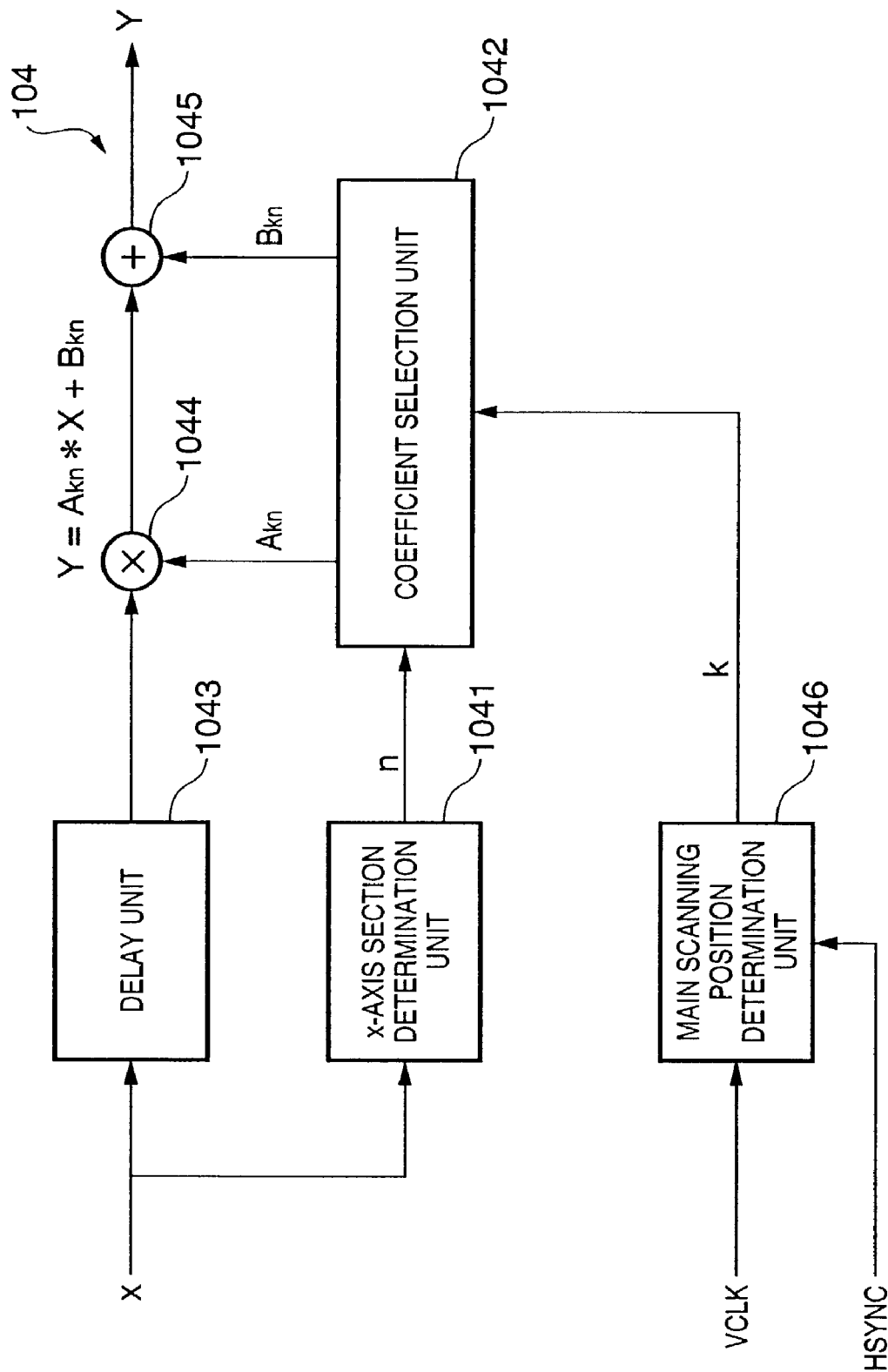
FIG. 16 is a block diagram showing details of a linearity correction unit according to the second embodiment of the present invention.

FIG. 16 is a block diagram showing details of the linearity correction unit 104. FIG. 16 shows one (for R) of the linearity correction circuits 104a to 104c. The remaining linearity correction circuits also have the same arrangement.

An x-axis section determination unit 1041 checks a section along the x-axis in FIGS. 15A and 15B, and determines which of four linear functions corresponds to this section. A determination output is given by n (section determination signal), and sent to a coefficient selection unit 1042. A main scanning position determination unit 1046 outputs a main scanning position signal k representing which of sensor chips arrayed in the main scanning direction outputs a signal to be processed. A delay unit 1043 adjusts the clock phase.

The coefficient selection unit 1042 selects a multiplicative coefficient Akn and additive factor Bkn on the basis of the section determination signal n and main scanning position signal k, and sends the multiplicative coefficient Akn and additive factor Bkn to a multiplication circuit 1044 and addition circuit 1045, respectively. As a result, $$Y = Akn * X + Bkn$$

is solved, and linearity correction described with reference to FIGS. 15A and 15B is realized for each chip.

The coefficients Akn and Bkn in the second embodiment change depending on the signal level of a signal to be corrected and a sensor chip which outputs the signal to be corrected. One linearity correction circuit has 64 (=×4 x-axis sections×16 sensor chips) different coefficients.

The coefficient selection unit 1042 in the second embodiment has 64 registers formed from flip-flops for the multiplication circuit 1044 in one linearity correction circuit, and 64 registers formed from flip-flops for the addition circuit 1045. Each register outputs a coefficient. Each register receives a proper value from the CPU in power-on operation. The coefficients Akn and Bkn are given as register setting values, which greatly shortens the write time in comparison with write of all input and output values which represent curves in the LUT.

The present invention is not limited to the above arrangement, and each coefficient value may be stored in, e.g., a ROM or SRAM. However, the data amount of coefficients is not so large, and storing the coefficients in the ROM or SRAM wastes many addresses and increases the cost. For this reason, the use of registers is the most preferable in consideration of the space and cost.

As described above, the linearities of image signals output from sensor chips having different linearities can be made to approach each other, thereby reducing the difference in reading halftone density.

A clock generator 121 generates a clock VCLK every pixel. A main scanning address counter 122 counts clocks from the clock generator 121, and generates a 1-line pixel address output. A decoder 123 decodes a main scanning address from the main scanning address counter 122, and generates line sensor driving signals (not shown) such as a shift pulse ($\phi$SH) and reset pulse ($\phi$R), and a line sync signal HSYNC. The main scanning address counter 122 is cleared in synchronism with a HSYNC signal, and starts counting of the main scanning address of the next line.

Figure 28:
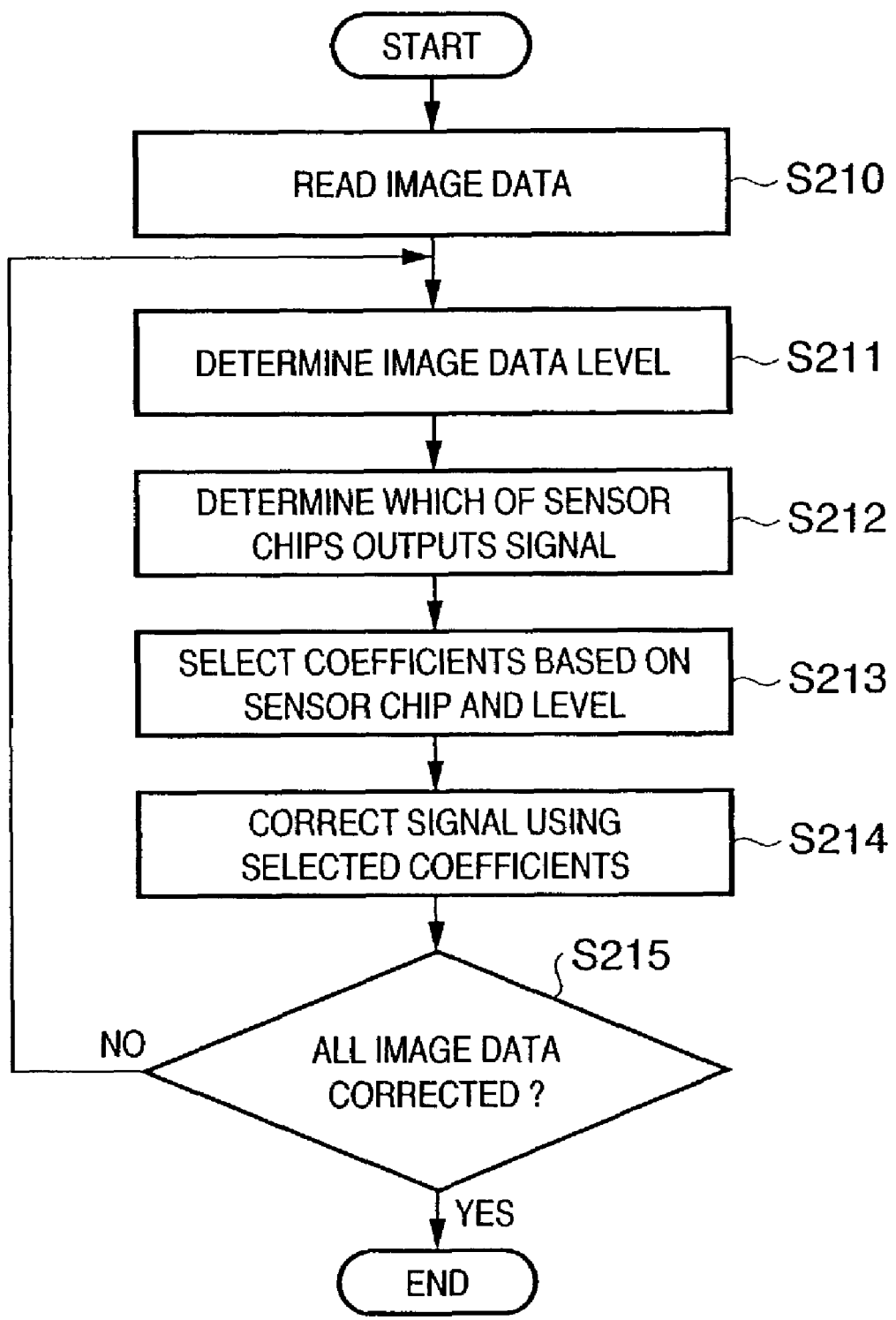
FIG. 28 is a flow chart showing linearity correction processing according to the second embodiment of the present invention.

The operation of the image processing apparatus shown in FIG. 10 will be explained with reference to the flow chart of FIG. 28.

Figure 17:
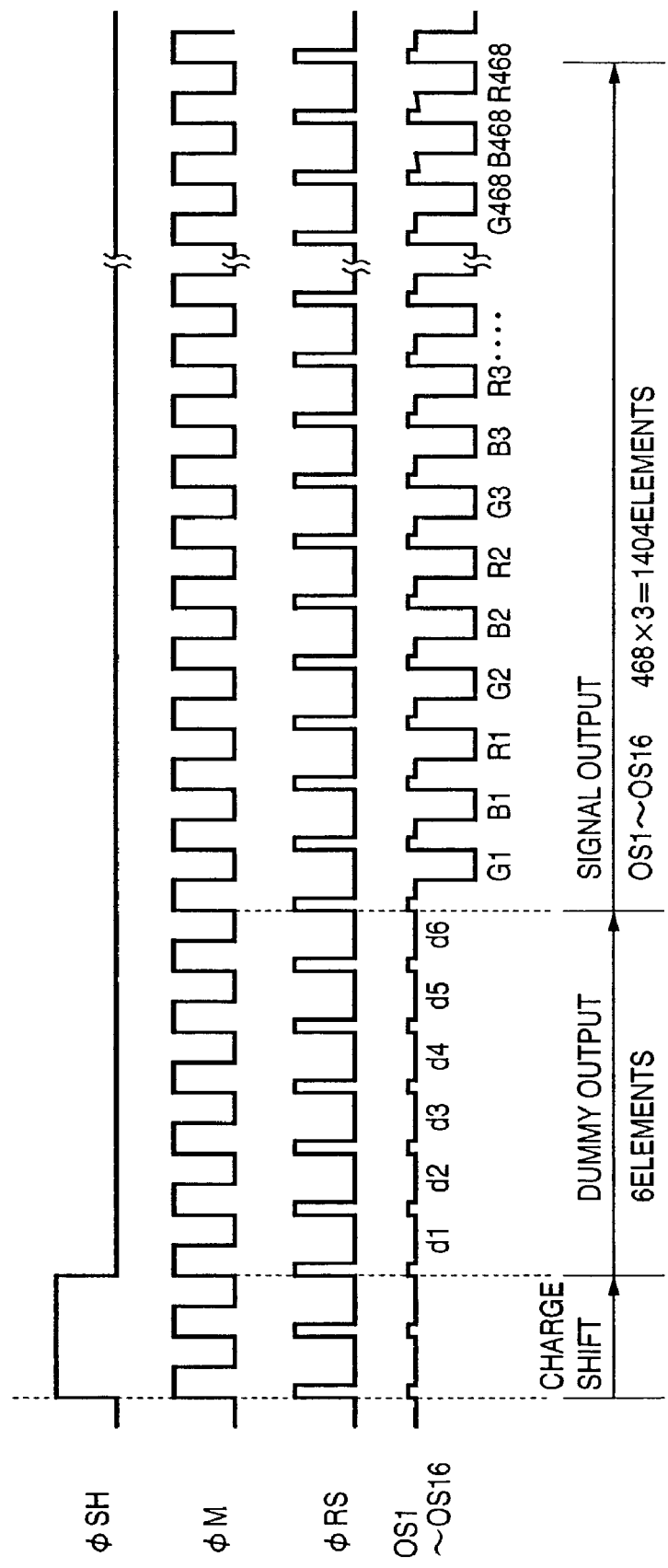
FIG. 17 is a timing chart showing the driving and output of the multi-chip sensor according to the second embodiment of the present invention.

The multi-chip sensor 2024 outputs an analog signal (step S210). FIG. 17 is a timing chart for explaining the timing of a driving signal to the multi-chip sensor 2024 and the timing of an analog signal output from the multi-chip sensor 2024.

The timings in this timing chart are the same in all sensor chips. $\phi$SH represents a line sync signal, which also serves as a charge transfer pulse from the photodiode of each pixel to the charge transfer unit 2024-4 (FIG. 14). As shown in FIG. 17, transferred charges are sequentially output from the output amplifiers OS1 to OS16 in an order of G1, B1, R1, G2, B2, R2, . . . . $\phi$RS represents a reset pulse, which supplies a reset signal to the multi-chip sensor 2024.

An analog signal output from the CIS module 202 is input to the analog signal processor 101, undergoes gain adjustment and offset adjustment, and is A/D-converted. The sorting unit 102 properly sorts signals, and converts them into, e.g., 10-bit digital image signals R1, G1, and B1 for respective color signals.

The image signals are input to the shading correction unit 103, and undergo shading correction for the respective colors by using signals obtained by reading a white reference plate (not shown).

Figure 18:
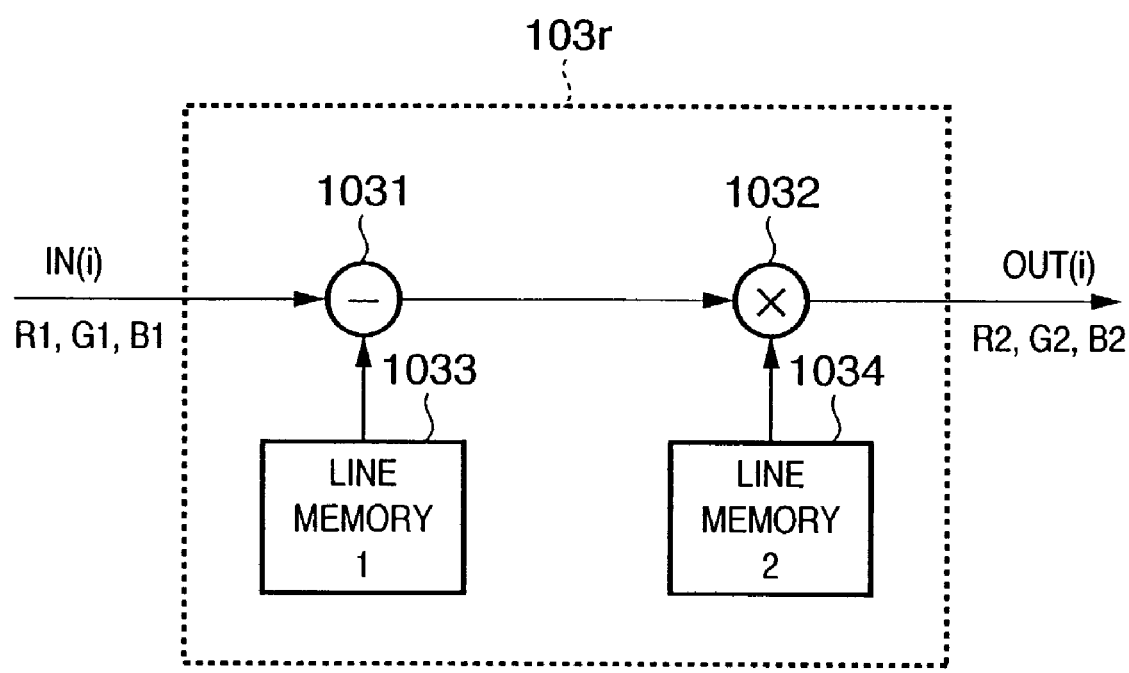
FIG. 18 is a block diagram showing a shading correction unit according to the second embodiment of the present invention.

Details of shading correction operation will be described with reference to FIG. 18. For illustrative convenience, FIG. 18 shows only one (103r in FIG. 18) of the shading correction circuits 103r, 103g, and 103b included in the shading correction unit 103.

In shading data acquisition operation, the light source is turned off, and black reference data Bk(i) is sampled for each pixel and stored in line memory 1. The CIS module 202 is moved to the position of a white reference plate, the light source is turned on, and white reference data WH(i) is sampled and stored. Calculation of converting the data into white shading correction data:

$$1/(WH(i)-Bk(i))$$

is executed, and the resultant data is stored in line memory 2.

In actual image reading, calculation: OUT(i)=(IN(i)−Bk(i))×1/(WH(i)−Bk(i)) is performed in real time for each pixel, and data having undergone shading correction is output.

In this case, IN(i) represents the ith input data; OUT(i), the ith output data; Bk(i), the ith black reference data in line memory 1; and 1/(WH(i)−Bk(i)), the ith white shading correction data.

In general, the CIS desirably has a memory which stores the correction value of each pixel even for black shading because black noise is large due to a large pixel and the offset value is different between a plurality of chips. To the contrary, the CCD generally has a uniformly subtracting register.

For cost priority, the CIS can also take an arrangement which reduces the cost by using the black correction value of each chip or the like.

Figure 19:
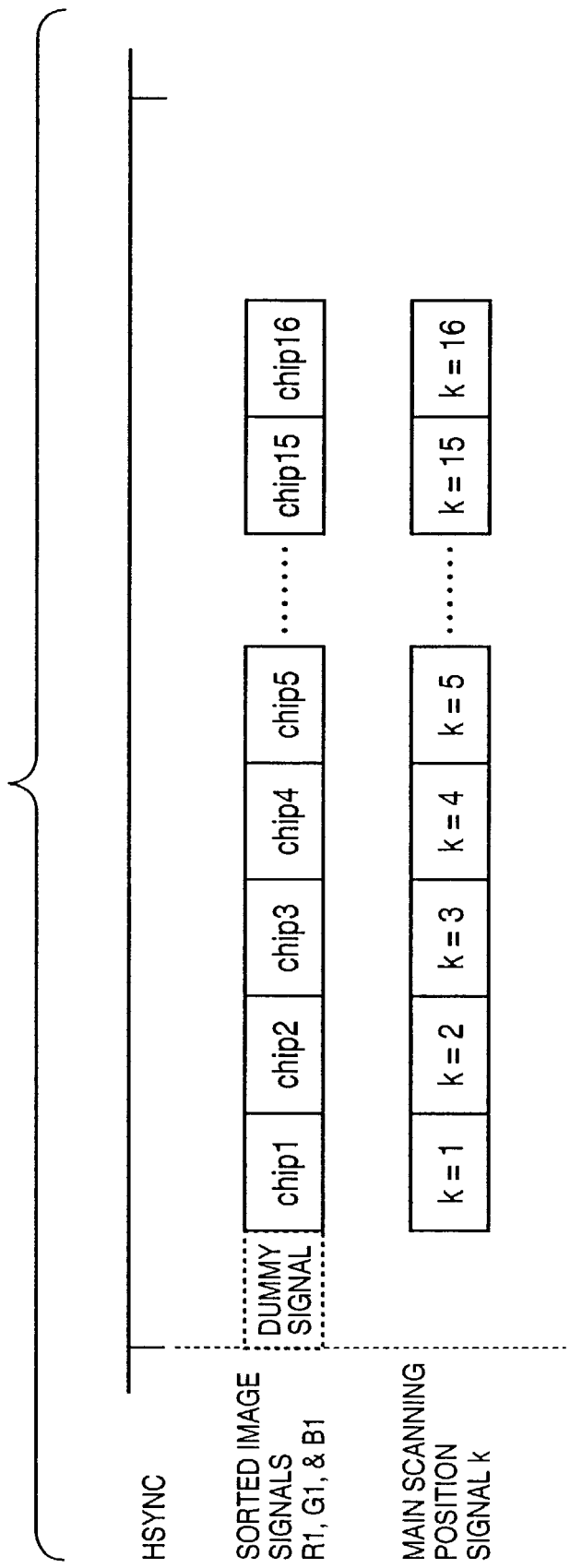
FIG. 19 is a timing chart for explaining the output timing of a sorted image signal according to the second embodiment of the present invention.

FIG. 19 is a view for explaining the timing of a sorted signal output from the sorting unit 102. FIG. 19 shows the timing of only one of R, G, and B colors for illustrative convenience.

A sensor-specific dummy signal is output for a while after the line sync signal HSYNC. In an effective pixel area, n sensor chip signals are sequentially output in an order of Chip1, Chip2, . . . , ChipN from the first chip. In the second embodiment, N=16. Since each chip has 468 pixels, 468×16=7488 effective pixels are obtained. Then, a dummy pixel signal is output again. While signals are output from respective chips, the linearity correction circuits 104a, 104b, and 104c output corresponding main scanning position signals k from their main scanning position determination units 1046 shown in FIG. 16.

Signals from the shading correction unit 103 are input to the linearity correction unit 104, and undergo linearity correction by the above-described method.

First, signals from the shading correction unit 103 are input parallel to each other to the delay units 1043 and x-axis section determination units 1041 of the linearity correction circuits 104a, 104b, and 104c. Then, each x-axis section determination unit 1041 determines the signal level of the signal (section described with reference to FIGS. 15A and 15B), and outputs a corresponding section determination signal n (step S211).

The main scanning position determination unit 1046 outputs a main scanning position signal k representing which of sensor chips outputs the signal input from the shading correction unit 103 (step S212).

The coefficient selection unit 1042 outputs coefficients Akn and Bkn selected in accordance with the section determination signal n and main scanning position signal k (step S213). The multiplication circuit 1044 multiplies the signal from the delay unit 1043 by the coefficient Akn. The addition circuit 1045 adds the signal from the multiplication circuit 1044 and the coefficient Bkn (step S214).

A signal from the linearity correction unit 104 is input to an image processing circuit (not shown), and undergoes various correction processes such as color correction and gamma correction. The above processing is performed for all image data (step S215).

An image forming apparatus in which the above-described image processing apparatus is mounted will be explained.

Figure 20:
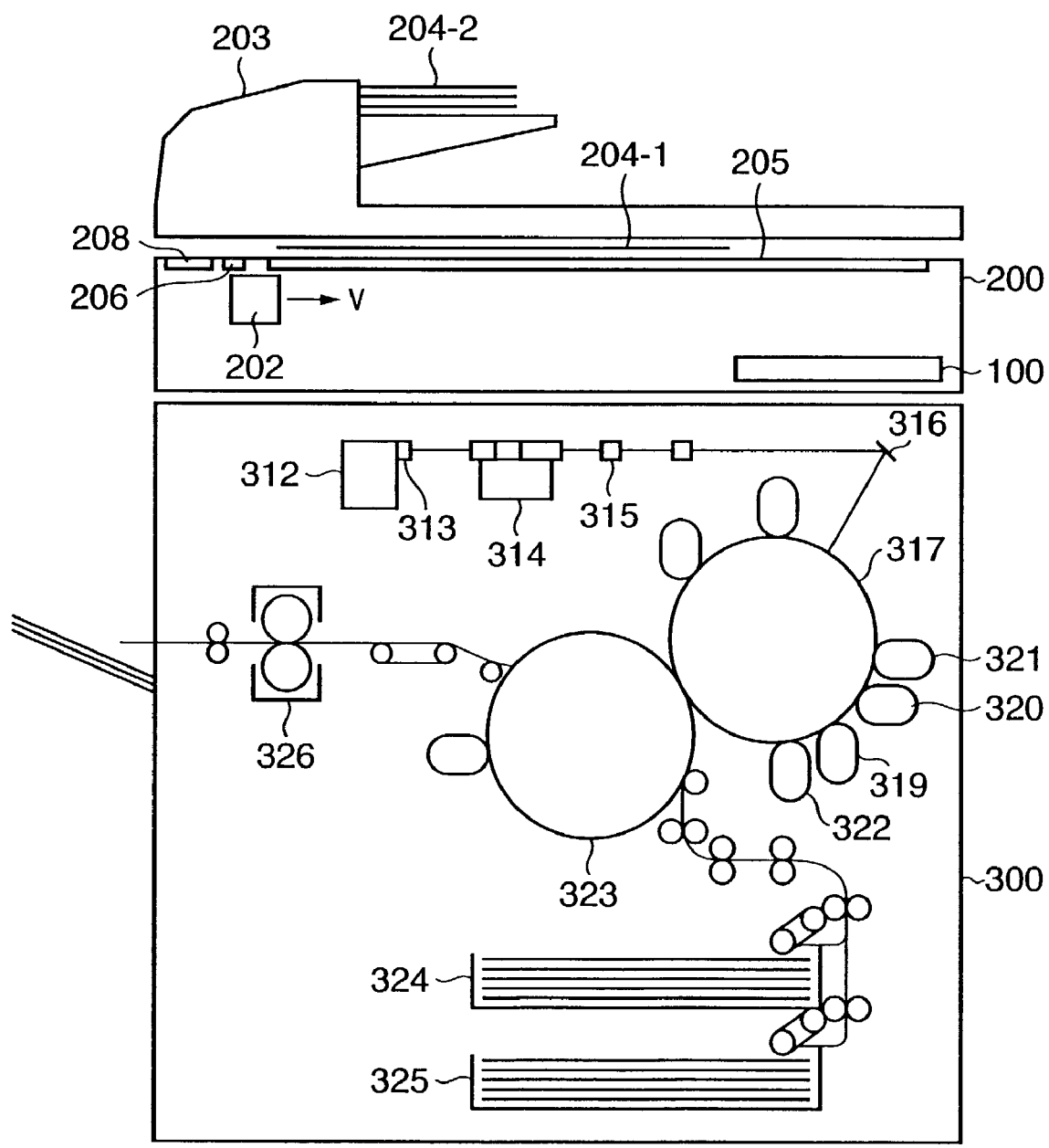
FIG. 20 is a schematic view showing an image forming apparatus in which the image processing apparatus is mounted according to the second embodiment of the present invention.

In FIG. 20, reference numeral 200 denotes an image scanner section which reads a document and executes digital signal processing; and 300, a printer section which prints out, on a sheet in full colors, an image corresponding to the document image read by the image scanner section 200.

In the image scanner section 200, a document 204-1 set on a platen glass 205 by the platen cover of an automatic document feeder (ADF) 203 is irradiated with light from the illumination light source 2022 in the CIS module 202 having the arrangement shown in FIG. 12. Light reflected by the document 204-1 forms an image on the multi-chip sensor 2024 via the lens 2023.

Alternatively, the CIS module 202 is stopped at the position of a flow scanning glass 208, and a document is read at this position. In this operation, document sheets are successively supplied from the ADF 203 and read.

The multi-chip sensor 2024 separates optical information from the document into colors, reads R (Red), G (Green), and B (Blue) components of the full-color information, and sends the components to a signal processor 100 in FIG. 10. Each of the pixel arrays 2024-1 to 2024-3 for respective colors of the multi-chip sensor 2024 is made up of, e.g., 7,500 pixels. Thus, an A3-size document 297 mm in the widthwise direction, which has the maximum size among documents set on the platen glass 205, can be read at a resolution of 600 dpi.

To read the document 204-1 on the platen glass 205, the CIS module 202 is mechanically moved at a velocity V in the sub-scanning direction to scan the entire surface of the document 204-1.

A white reference plate 206 is used to obtain white correction data for data read by the R, G, and B pixel arrays 2024-1 to 2024-3 of the multi-chip sensor 2024. The white reference plate 206 exhibits an almost uniform reflection characteristic for visible light, and has a visually white color. By using data obtained by reading the white reference plate 206, data output from the R, G, and B pixel arrays 2024-1 to 2024-3 are corrected.

On the stage subsequent to the signal processor 100, a read signal is electrically processed and separated into M (Magenta), C (Cyan), Y (Yellow), and Bk (Black) components, and these components are sent to the printer section 300. One of the M, C, Y, and Bk components is sent to the printer section 300 every document scanning in the image scanner section 200, completing a copy printout.

In the printer section 300, M, C, Y, and Bk image signals are sent to a laser driver 312. The laser driver 312 modulates and drives a semiconductor laser 313 in accordance with the image signal. A laser beam scans a photosensitive drum 317 via a polygon mirror 314, f-θ lens 315, and mirror 316.

The developing unit is constituted by a magenta developing unit 319, cyan developing unit 320, yellow developing unit 321, and black developing unit 322. The four developing units alternately come into contact with the electrostatic drum 317, and develop M, C, Y, and Bk electrostatic latent images formed on the electrostatic drum 317 with corresponding toners. A sheet fed from a sheet cassette 324 or 325 is wound around a transfer drum 323, and a toner image developed on the electrostatic drum 317 is transferred to the sheet.

After toner images of four, M, C, Y, and Bk colors are sequentially transferred, the sheet is discharged via a fixing unit 326.

Note that the image reader with a CIS and the image processing apparatus described in the first embodiment can also be applied to the image scanner section 200 of FIG. 20.

Third Embodiment

The third embodiment will be explained. Only the difference from the second embodiment will be described, and a description of the same part will be omitted.

Figure 21:
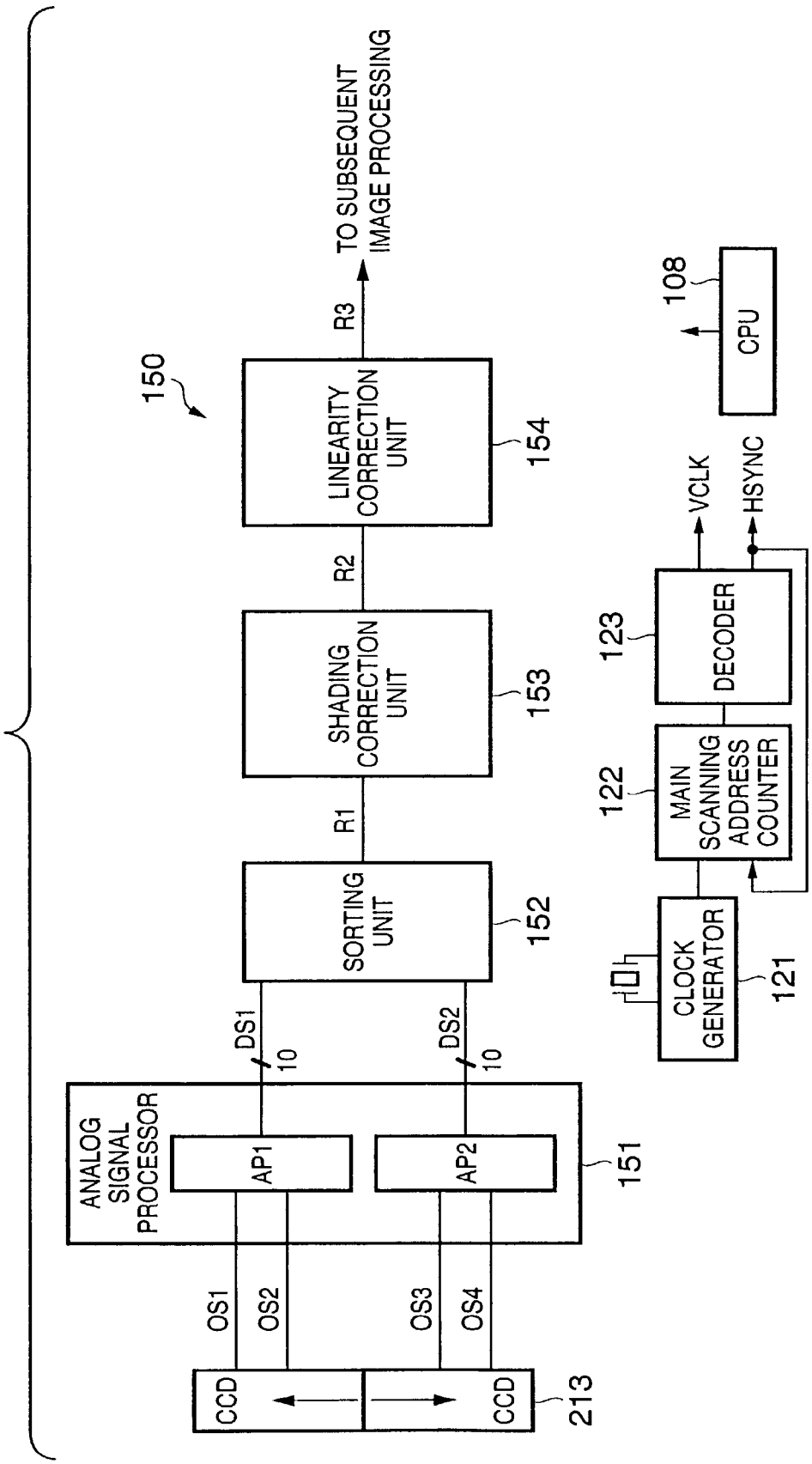
FIG. 21 is a block diagram showing the arrangement of an image processing apparatus according to the third embodiment of the present invention.

FIG. 21 is a block diagram showing an image processing apparatus according to the third embodiment of the present invention.

Reference numeral 213 denotes a center-division two-end-read type CCD image sensor serving as an image sensing unit which includes a plurality of pixels and a plurality of output units for outputting signals from the pixels.

Figure 22:
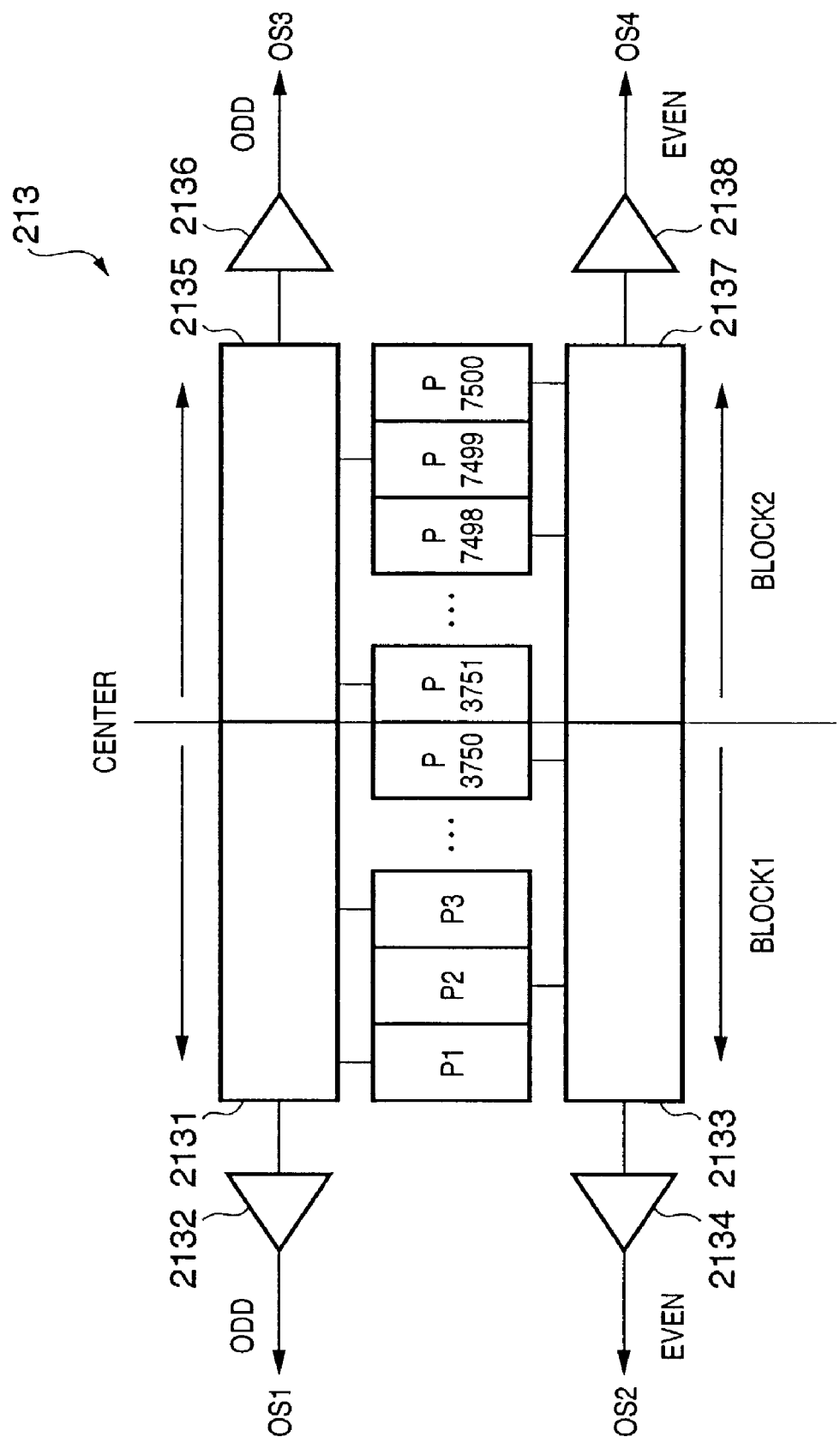
FIG. 22 is a block diagram showing the concept of a center-division two-end-read type CCD image sensor.

FIG. 22 is a block diagram for explaining details of the CCD image sensor 213.

Reference symbols P1, P2, ..., P7500 denote photodiodes as photoelectric converters which read and accumulate image information for 7,500 pixels in the main scanning direction. The sensor is divided into left and right parts at the boundary between the 3750th and 3751st central pixels. Charges in the photodiodes are transferred to CCD analog shift registers 2131, 2133, 2135, and 2137 in response to shift pulses (not shown).

More specifically, charges in odd-numbered pixels P1 to P3749 are transferred to the CCD analog shift register 2131, and output as OS1 from an output buffer 2132 in response to a transfer clock.

Charges in even-numbered pixels P2 to P3750 are transferred to the CCD analog shift register 2133, and output as OS2 from an output buffer 2134 in response to a transfer clock.

Charges in odd-numbered pixels P3751 to P7499 are transferred to the CCD analog shift register 2135, and output as OS3 from an output buffer 2136 in response to a transfer clock.

Charges in even-numbered pixels P3752 to P7500 are transferred to the CCD analog shift register 2137, and output as OS4 from an output buffer 2138 in response to a transfer clock.

In this fashion, signals from monochrome 7,500 pixels are divided into left and right parts, further divided into odd and even numbers, and read out as four output signals. For this reason, OS1 to OS4 vary in linearity, similar to the second embodiment. Since the sensor is divided at the center, the halftone reading density becomes different between the left and right sides at boundary of the division line, degrading the image quality.

The third embodiment will exemplify a monochrome image. For a color image, R, G, and B filters are formed on photodiodes, and three CCD image sensors are arranged parallel to each other.

The analog signals OS1 to OS4 output from the CCD image sensor 213 undergo gain & offset adjustment by an analog processor 151. Then, the signals OS1 to OS4 are A/D-converted, and output as two digital signals DS1 and DS2. A sorting unit 152 corrects a state in which the image reading directions of DS1 and DS2 are opposite by 180°, and sorts signals so as to appropriately connect signals from the 3750th and 3751st central pixels. A signal R1 is a sorted signal. A shading unit 153 performs the same shading correction as that in the first embodiment.

A linearity correction unit 154 executes the same linearity correction as that described in the second embodiment with reference to FIGS. 15A, 15B, and 16.

FIG. 21 shows an arrangement for a monochrome signal. For a color signal, red, green, and blue shading correction circuits and linearity correction circuits are arranged parallel to each other.

Figure 23:
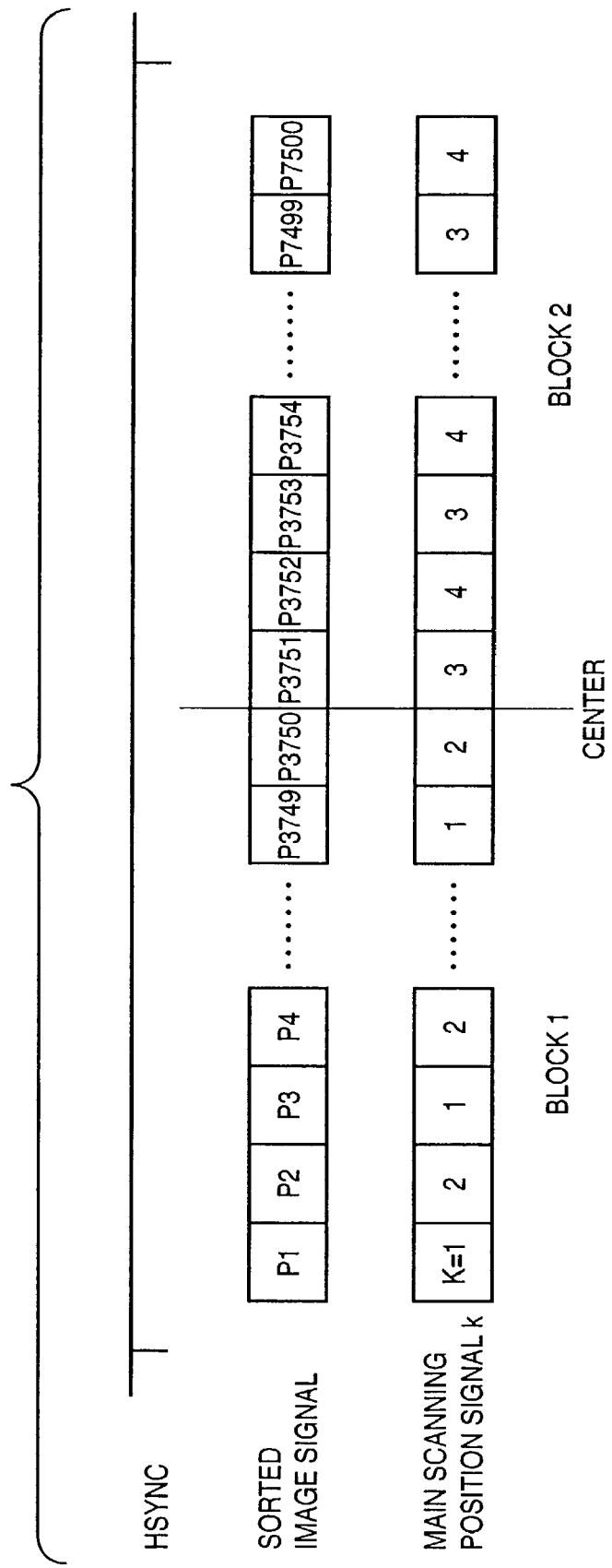
FIG. 23 is a timing chart for explaining the output timing of a sorted image signal according to the third embodiment of the present invention.

FIG. 23 is a timing chart for explaining an image signal after the sorting unit 152. Reference symbol HSYNC denotes a line sync signal; and P1 to P7500, image signals which are so sorted as to make the central image signals P3750 and P3751 adjacent to each other. A main scanning position signal k is generated in correspondence with each pixel. k=1 is generated for the odd-numbered pixels P1 to P3749; k=2, for the even-numbered pixels P2 to P3750; k=3, for the odd-numbered pixels P3751 to P7499; and k=4, for the even-numbered pixels P3752 to P7500.

The main scanning position signal k=1 to 4 is generated by a main scanning position determination unit 1046 in FIG. 16.

Similar to the second embodiment, the arrangement of the linearity correction unit 154 in FIG. 16 and linearity correction in FIGS. 15A and 15B realized by the linearity correction unit 154 can suppress the reading density difference between right and left pixels classified at the center and between odd- and even-numbered pixels, thereby improving the image quality.

Linearity correction in the third embodiment is not limited to the method of the second embodiment, but can also be achieved by the method described in the first embodiment.

Figure 24:
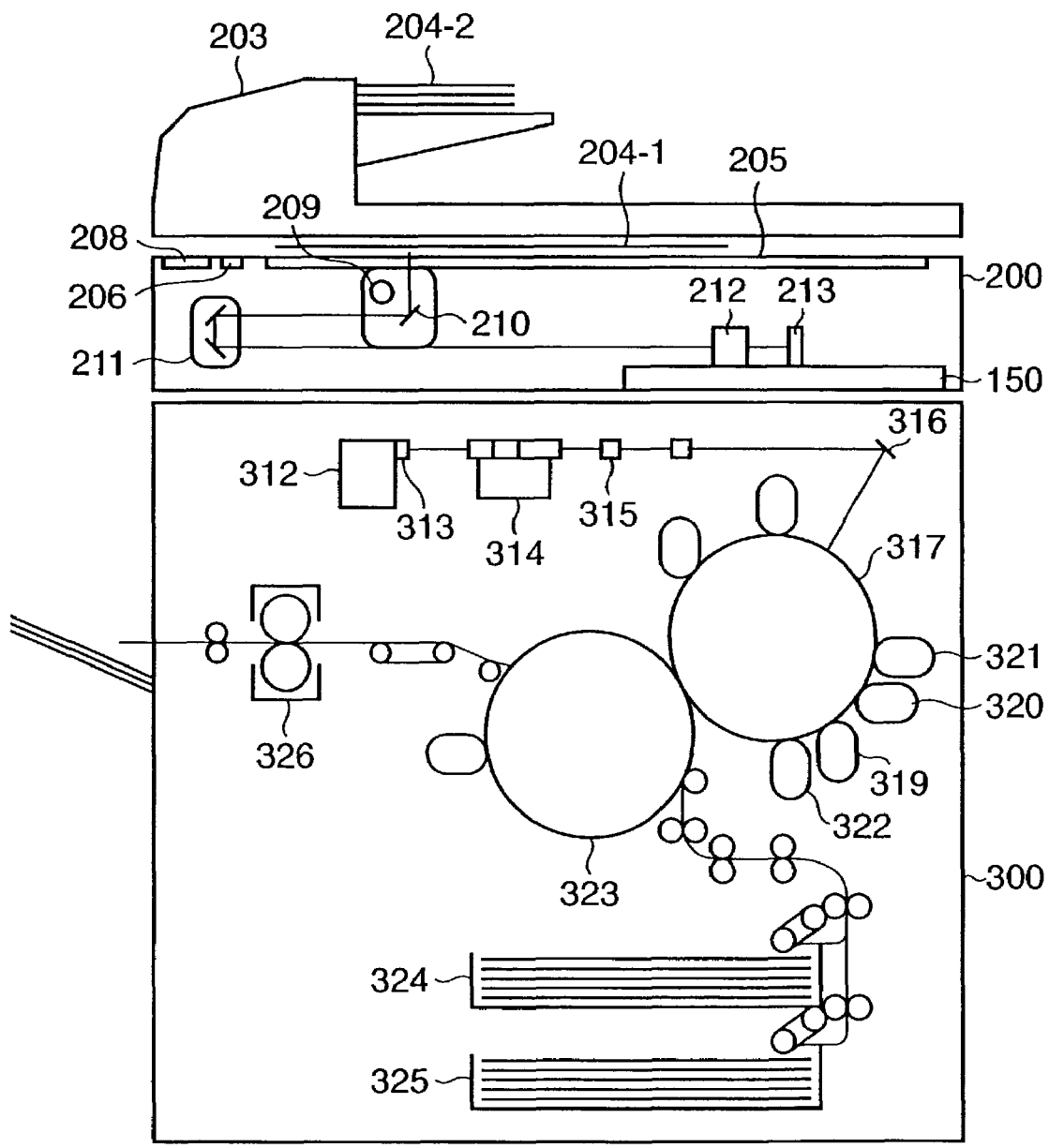
FIG. 24 is a schematic view showing an image forming apparatus in which the image processing apparatus is mounted according to the third embodiment of the present invention.

FIG. 24 is a schematic view showing the sectional arrangement of an image forming apparatus in which the above-described image processing apparatus is mounted. In FIG. 24, the same reference numerals as in FIG. 20 denote the same parts, and a description thereof will be omitted. Reference numeral 200 denotes an image scanner section which reads a document and executes digital signal processing; and 300, a printer section which prints out, on a sheet in full colors, an image corresponding to the document image read by the image scanner section 200.

A light source 209 is formed from a xenon lamp, and illuminates a document. A first mirror 210 deflects optical information of an illuminated document by 90° toward a second mirror 211. The second mirror 211 is formed from a set of two mirrors, and deflects the optical information by 180° to a reduction imaging lens 212. The lens 212 forms the image of the optical information on a CCD image sensor 213. A set of the first mirror 210 and light source 209 scan the document at a velocity V, whereas the second mirror 211 moves at half the velocity in the same direction.

Other Embodiment

The present invention can be applied to a system constituted by a plurality of devices or to an apparatus comprising a single device.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and LAN, can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts shown in FIGS. 25 and 26, or 27 and 28 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image processing apparatus comprising:
   a plurality of image sensor chips, which are linearly arrayed, which reads a document and outputs image signals, each of said plurality of image sensor chips including a plurality of pixels;
   a memory which stores a plurality of linearity correction tables for correcting linearity of signals output from said plurality of image sensor chips, said linearity correction tables being shared among the plurality of image sensor chips;
   a register which stores a correspondence relationship, between each of said image sensor chips and one of said linearity correction tables stored in said memory, said correspondence relationship being based on image signals output from each of said plurality of image sensor chips which read a density reference member;
   a selector which respectively selects one of said plurality of linearity correction tables stored in said memory for each of said plurality of image sensor chips in accordance with said correspondence relationship stored in said register; and
   a corrector which respectively performs linearity correction of correcting linearity of signals output from said plurality of image sensor based on the linearity correction tables selected for said plurality of image sensor chips by said selector.

2. The apparatus according to claim 1, wherein said density reference member has a halftone gray reference area.

3. The apparatus according to claim 2, wherein the plurality of linearity correction tables include first linearity correction table which said selector selects in a case where the image signal output from said image sensor chip upon reading said density reference member falls within a predetermined range, second linearity correction table which said selector selects in a case where the image signal output from said image sensor chip upon reading said density reference member exceeds the predetermined range, and third linearity correction table which said selector selects in a case where the image signal output from said image sensor chip upon reading said density reference member is below the predetermined range.

4. The apparatus according to claim 1, wherein image signals from said plurality of image sensor chips are output via different output systems.

5. The apparatus according to claim 1, wherein said density reference member includes a white reference area and a halftone reference data,
   wherein said corrector executes first correction of performing shading correction on the basis of a signal obtained by reading the white reference area by said image sensor chips, and second correction of performing the linearity correction.

6. The apparatus according to claim 5, wherein said corrector performs the second correction after the first correction.

7. The apparatus according to claim 1, wherein the pixels of each of the plurality of image sensor chips are divided by odd and even numbers.

* * * * *